United States Patent
Sugiyama et al.

(10) Patent No.: US 10,809,082 B2
(45) Date of Patent: Oct. 20, 2020

(54) INFORMATION PROCESSING APPARATUS, RIDING VEHICLE ADJUSTING METHOD, AND RIDING VEHICLE ADJUSTING PROGRAM

(71) Applicant: TOYOTA JIDOSHA KABUSHIKI KAISHA, Toyota-shi, Aichi-ken (JP)

(72) Inventors: Koseki Sugiyama, Suntou-gun (JP); Atsuko Kobayashi, Nagoya (JP); Hiroki Asano, Toyota (JP); Harunobu Saito, Nagoya (JP); Yoshihiro Tsuge, Toyota (JP); Tae Sugimura, Miyoshi (JP); Kuniaki Jinnai, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/520,729

(22) Filed: Jul. 24, 2019

(65) Prior Publication Data
US 2020/0041292 A1 Feb. 6, 2020

(30) Foreign Application Priority Data
Jul. 31, 2018 (JP) .................................. 2018-144193

(51) Int. Cl.
*G01C 21/34* (2006.01)
*G06Q 50/30* (2012.01)
*H04W 4/029* (2018.01)

(52) U.S. Cl.
CPC ......... *G01C 21/3438* (2013.01); *G06Q 50/30* (2013.01); *H04W 4/029* (2018.02)

(58) Field of Classification Search
CPC .. G06Q 10/02; G06Q 10/06311; G06Q 50/30; G06Q 50/32
See application file for complete search history.

(56) References Cited

U.S. PATENT DOCUMENTS

| 10,248,913 B1* | 4/2019 | Gururajan | G06Q 50/30 |
| 10,310,505 B1* | 6/2019 | Hanson | G05D 1/0088 |
| 2016/0364823 A1* | 12/2016 | Cao | G06Q 50/30 |
| 2017/0169366 A1* | 6/2017 | Klein | G06Q 10/025 |
| 2018/0374014 A1* | 12/2018 | Matsui | G06Q 10/06311 |
| 2019/0079519 A1* | 3/2019 | Hwang | G05D 1/0088 |
| 2019/0265703 A1* | 8/2019 | Hicok | G05B 13/027 |
| 2019/0279487 A1* | 9/2019 | Hirose | G06K 9/00832 |

FOREIGN PATENT DOCUMENTS

JP 2007-163231 A 6/2007

* cited by examiner

*Primary Examiner* — Liton Miah
(74) *Attorney, Agent, or Firm* — Oliff PLC

(57) ABSTRACT

An information processing apparatus according to the present disclosure includes a controller configured to execute: accepting an alighting request to allow a first user to alight at a place other than a travel destination of the first user while a first vehicle allows the first user to ride and travels; performing determination of an alighting place where the first user is allowed to alight, and extraction of one or more candidate vehicles capable of allowing the first user to board at a boarding place that is a place identical to the alighting place or a place adjacent thereto, according to the alighting request; and notifying a request for the first user's reboarding at the boarding place, to a second vehicle that is one of the one or more candidate vehicles, based on an approval by the first user.

9 Claims, 15 Drawing Sheets

| VEHICLE NO. | DRIVER ID | VEHICLE TYPE | TRAVEL SCHEDULE | RIDESHARE RESERVATION | EXECUTION FLAG | TRAVELING POSITION | DESTINATION |
|---|---|---|---|---|---|---|---|
| X10 | S001 | A100 | sssss | xxxxxxxx | IN EXECUTION | P111 | G111 |
| X20 | S002 | A200 | ttttt | yyyyyyyy | NOT EXECUTED | P222 | G222 |
| X30 | S003 | A300 | uuuuu | zzzzzzzz | NOT EXECUTED | P333 | G333 |

Fig. 4

| DRIVER ID | USER ID | VEHICLE NO. | BOARDING PLACE | SCHEDULED BOARDING TIME | TRAVEL DESTINATION | DESIRED ARRIVAL TIME | PASSENGER | STATUS |
|---|---|---|---|---|---|---|---|---|
| S001 | C001 | X10 | f | 8:00 | g | 9:00 | ABSENT | COMPLETED |
| S001 | C002 | X10 | h | 8:30 | e | 9:30 | PRESENT | COMPLETED |
| S002 | C003 | X20 | p | 10:00 | q | 11:00 | ABSENT | IN EXECUTION |

Fig. 5A

| DRIVER ID | USER ID | VEHICLE NO. | BOARDING PLACE | SCHEDULED BOARDING TIME | TRAVEL DESTINATION | DESIRED ARRIVAL TIME | PASSENGER | STATUS |
|---|---|---|---|---|---|---|---|---|
| S001 | C001 | X10 | f | 8:00 | g | 9:00 | ABSENT | COMPLETED |
| S001 | C002 | X10 | h | 8:30 | e | 9:30 | PRESENT | COMPLETED |
| S002 | C003 | X20 | p | 10:00 | q | 11:00 | ABSENT | MIDTERM CANCELLATION |
| S003 | C003 | X30 | r0 | 10:40 | q | 11:00 | ABSENT | INCOMPLETE |

INFORMATION PROCESSING APPARATUS, RIDING VEHICLE ADJUSTING METHOD, AND RIDING VEHICLE ADJUSTING PROGRAM

CROSS REFERENCE TO RELATED APPLICATION

This application claims priority to Japanese Patent Application No. 2018-144193, filed on Jul. 31, 2018, which is hereby incorporated by reference herein in its entirety.

BACKGROUND

Technical Field

The present disclosure relates to an information processing apparatus, a riding vehicle adjusting method, and a riding vehicle adjusting program.

Description of the Related Art

Patent document 1 discloses a technique related to an information acquisition apparatus that allows a first meeting person to know that a second meeting person, or an opposite party to be met, is to be late from a meeting time even without any notification from this party. According to this technique, if the information acquisition apparatus determines that the meeting time is not to be kept, the meeting time is changed and the changed meeting time is notified to both the parties.

CITATION LIST

Patent Document

[Patent document 1] Japanese Patent Laid-Open No. 2007-163231

SUMMARY

The present disclosure has an object to provide a technique that extracts an alternative vehicle to support a user's travel when a request to allow the user to alight during rideshare is issued.

An information processing apparatus according to the present disclosure comprises a controller configured to execute: accepting an alighting request to allow a first user to alight at a place other than a travel destination of the first user while a first vehicle allows the first user to ride and travels; performing determination of an alighting place where the first user is allowed to alight, and extraction of one or more candidate vehicles capable of allowing the first user to board at a boarding place that is a place identical to the alighting place or a place adjacent thereto, according to the alighting request; and notifying a request for the first user's reboarding at the boarding place, to a second vehicle that is one of the one or more candidate vehicles, based on an approval by the first user.

The present disclosure can also be grasped in view of a riding vehicle adjusting method by a computer. That is, a riding vehicle adjusting method of the present disclosure causes a computer to: accept an alighting request to allow a first user to alight at a place other than a travel destination of the first user while a first vehicle allows the first user to ride and travels; perform determination of an alighting place where the first user is allowed to alight, and extraction of one or more candidate vehicles capable of allowing the first user to board at a boarding place that is a place identical to the alighting place or a place adjacent thereto, according to the alighting request; and notify a request for the first user's reboarding at the boarding place, to a second vehicle that is one of the one or more candidate vehicles, based on an approval by the first user.

The present disclosure can also be grasped in view of a riding vehicle adjusting program to be executed by a computer. That is, a riding vehicle adjusting program according to the present disclosure causes a computer to execute: a step of accepting an alighting request to allow a first user to alight at a place other than a travel destination of the first user while a first vehicle allows the first user to ride and travels; a step of performing determination of an alighting place where the first user is allowed to alight, and extraction of one or more candidate vehicles capable of allowing the first user to board at a boarding place that is a place identical to the alighting place or a place adjacent thereto, according to the alighting request; and a step of notifying a request for the first user's reboarding at the boarding place, to a second vehicle that is one of the one or more candidate vehicles, based on an approval by the first user.

According to the present disclosure, an alternative vehicle can be extracted to support the user's travel when a request to allow the user to alight during rideshare is issued.

BRIEF DESCRIPTION OF THE DRAWINGS

FIG. 4 depicts a data structure of vehicle information in a vehicle database that the server apparatus has;

FIG. 5A is a first diagram depicting a data structure of use management information in a use management database that the server apparatus has;

FIG. 5B is a second diagram depicting a data structure of use management information in a use management database that the server apparatus has;

FIG. 9 is a diagram depicting an example of a display screen that is displayed on the user terminal in the riding vehicle adjustment control, for proposing that a rideshare vehicle is to be changed;

DESCRIPTION OF THE EMBODIMENTS

Figure 1:
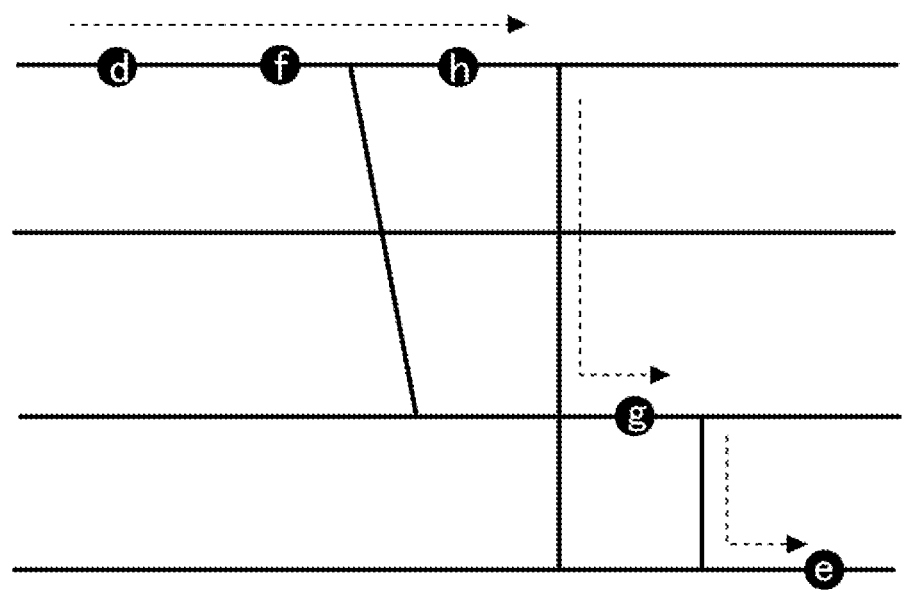
FIG. 1 is a diagram for illustrating a concept of rideshare.

A controller of an information processing apparatus according to the present disclosure accepts an alighting request to allow a first user to alight, while rideshare for allowing the first user to ride a first vehicle is performed. The alighting request is related to the rideshare for the first user, and may be issued by the first user, for example. In this case, the alighting request may include information related to an alighting place requested by the first user. The alighting request may be issued by the first vehicle. Furthermore, the alighting request may be issued by what is different from the first user and the first vehicle, on the basis of the first user and/or information related to the first user.

Here, the alighting request is issued while the rideshare is performed. Upon acceptance of the alighting request, the first user alights from the riding vehicle before traveling to the travel destination irrespective of where the request is issued. As a result, the first user's travel to the travel destination is inhibited. Upon acceptance of the alighting request, the controller performs determination of the alighting place where the first user is allowed to alight, and extraction of one or more candidate vehicles, according to the alighting request. The processes related to determination of the alighting place and extraction of the candidate vehicles by the controller can be appropriately executed, according to the content of the accepted alighting request. The execution order of the process related to the determination and the process related to the extraction is not specifically limited.

Preferably, the determination of the alighting place by the controller may be, in principle, determination of a place where the first user requests to alight if the alighting request is issued by the first user. However, in some circumstances or the like of the first vehicle allowing the first user to ride, a place other than the place requested by the first user may be determined as the alighting place. If the alighting request is caused by the first vehicle, it is preferable to determine, as the alighting place, a place allowing the first user to travel to the travel destination as quickly as possible, that is, a place where the candidate vehicle possible of allowing the first user to travel to the travel destination on behalf of the first vehicle allows the first user to board easily, in consideration of disadvantages of the first user riding therein. Preferably, for example, a place where the candidate vehicle is scheduled to pass, or a place adjacent to the scheduled passing place is determined as the alighting place. Of course, in this case, it is not hampered that a place other than the place where the candidate vehicle allows the first user to ride easily may be determined as the alighting place.

To achieve travel to the travel destination by the first user inhibited from traveling to the travel destination owing to the alighting request, it is preferable that extraction of the one or more candidate vehicles by the controller be extraction of vehicles capable of carrying the first user directly to the travel destination as candidate vehicles. Alternatively, as for the extraction, to facilitate the first user's travel to the travel destination, the controller may extract, as the candidate vehicles, vehicles which are to travel by way of a predetermined alighting place which is a place where even a vehicle which is not to travel by way of the travel destination of the first user can allow the first user to travel to the travel destination, based on information which the controller can obtain and which is related to a travel of a vehicle other than the first vehicle. The predetermined alighting place is a place preferable for allowing the riding first user to alight from the vehicle and reach the travel destination by transportation other than the vehicle, for example, a boarding place (a station, a bus stop or a place adjacent thereto) of public transportation (a railroad, bus, etc.) allowing the first user to travel to the travel destination. That is, instead of direct extraction of the vehicle that reaches the travel destination of the first user, the vehicle that does not reach the travel destination is extracted as the candidate vehicle. Accordingly, it can be considered that the extraction is performed, with a condition related to presentation of the candidate vehicle to the first user being relaxed. Even the candidate vehicle extracted in such a condition allows the first user to travel to the travel destination as a result. Accordingly, it is believed to be useful.

The controller of the information processing apparatus then notifies the request for the first user's reboarding the second vehicle that is one of the one or more candidate vehicles at the boarding place, on the basis of an approval made by the first user for the one or more candidate vehicles extracted as described above. If the first user's reboarding requested with respect to the second vehicle is approved, the first user can alight from the first vehicle at the alighting place and subsequently continue the travel toward the travel destination in the second vehicle. As described above, according to the information processing apparatus of the present disclosure, upon acceptance of the alighting request, the processes of determining the alighting place and of extraction are performed, and the approval is made by the first user, thereby suitably supporting the first user's travel.

First Embodiment

<System Overview>

An overview of a rideshare system 1 of this embodiment is described. First, referring to FIG. 1, the concept of rideshare, which is transportation allowing users matched by the rideshare system 1 to ride with each other and travel, is described. In FIG. 1, a user A travels from a departure point d to a destination point e, a user B travels from a departure point f to a destination point g, and a user C travels from a departure point h to a destination point e.

Here, if the users A to C separately travel to the destination points in the respective vehicles, the three vehicles are to be used. On the contrary, if the users A to C ride with each other (rideshare), the users are allowed to travel to the respective destinations in one vehicle. In an example depicted in FIG. 1, the user A serves as a driver of the vehicle, and drives the vehicle from the point d to the point e. In this case, the user A allows the user B to ride the vehicle driven by the user A at the point f, and allows the user C to ride the vehicle driven by the user A at the point h. The user A then travels by way of the point g at the middle of travel in the vehicle to the point e, which is the destination point of the user A and the user C, and allows the user B to alight at the point g, thereby enabling the user B to travel from the departure point f to the destination point g. Furthermore, the user A allows the user C to travel to the point e, which allows the user C to travel from the departure point h to the destination point e and can complete the travel of the user A.

Such rideshare can reduce the number of vehicles traveling on roads, which can in turn reduce traffic jams. The rideshare reduces the number of traveling vehicles. Accordingly, the environmental load due to the user's travel can be reduced (for example, reduction in $CO_2$ gas emission due to vehicle traveling, suppression of consumption of the amount of energy used for vehicle traveling (the amount of fuel in a case where the vehicle uses an internal combustion engine, and the electric energy in a case where the vehicle uses electric power) and the like). Note that the mode of the rideshare depicted in FIG. 1 is one example. In this embodiment, a publicly known matching technique combines the vehicle (driver) with a passenger who is to ride the vehicle, thereby achieving rideshare. In this embodiment, the passenger allowed to ride the vehicle is hereinafter called "user."

Figure 2:
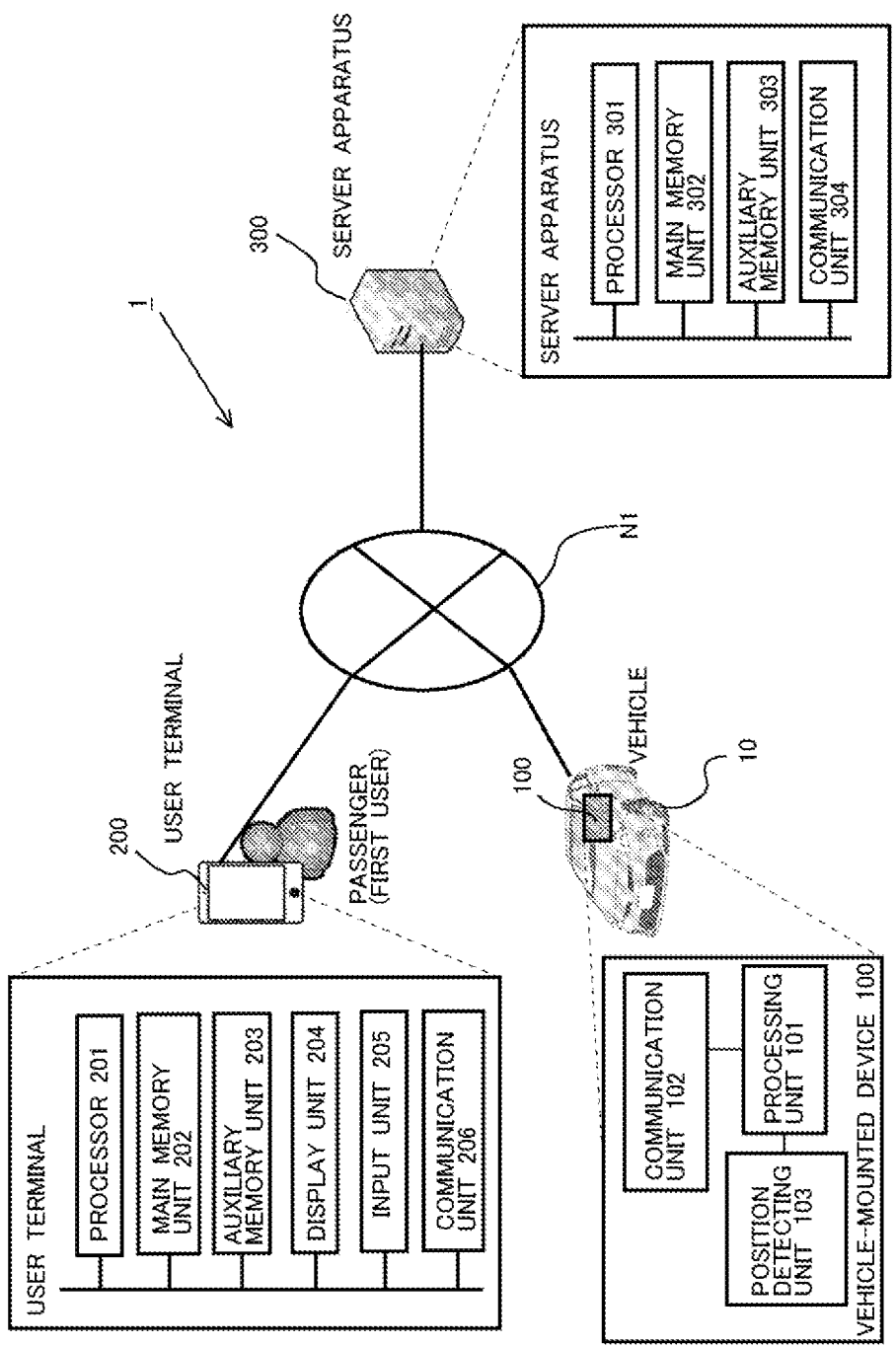
FIG. 2 depicts a schematic configuration of a rideshare system to which an information processing apparatus of the present disclosure is applied.

Here, referring to FIG. 2, the schematic configuration of the rideshare system 1 is described. The rideshare system 1 depicted in FIG. 2 is a system that performs a process of combining the first user with the vehicle in order to allow the first user to enjoy rideshare, that is, to allow the first user to ride a vehicle driven by another person or an automatically driven vehicle, and includes a vehicle 10, a vehicle-mounted device 100 installed in the vehicle 10, a user terminal 200 that is a terminal owned by the first user, and a server apparatus 300. The vehicle-mounted device 100, the user terminal 200, and the server apparatus 300 are connected to each other by a network N1. The network N1 is, for example, a worldwide public communication network, such as the Internet. A WAN (Wide Area Network) or another communication network may be adopted. The network N1 may include a telephone communication network such as of mobile phones, and a wireless communication network such as WiFi. Note that in the rideshare system 1 depicted in FIG. 2, the user terminal 200 of the first user, the vehicle 10, and the vehicle-mounted device 100 mounted thereon are exemplified. Another user can participate in the rideshare system 1 via the user terminal. Another vehicle can also participate in the rideshare system 1 via the vehicle-mounted device.

Here, the server apparatus 300 accepts a registration of information from the first user who uses rideshare. Identification information related to the first user and information on the vehicle provided for rideshare are registered in the server apparatus 300. The first user requesting a shared ride in any vehicle registered in the server apparatus 300 can register information indicating a request for a shared ride (hereinafter, request information) using the user terminal 200. Note that the first user can register, in the server apparatus 300, the request information through an application installed in the user terminal 200 for using a rideshare service (hereinafter, sometimes called "predetermined application"), for example. However, there is no intention of limitation to the mode of registering the request information using the user terminal 200. The first user may register the request information in the server apparatus 300 using any of terminals (a smartphone, a mobile phone, a tablet terminal, a personal information terminal, a wearable computer, etc.) and a personal computer (PC) that are connectable to the network N1. The identification information related to the first user, and the information on the vehicle provided for rideshare are preliminarily registered by the predetermined application. When the first user registers the request information using the predetermined application, user authentication is preliminarily performed using a password or the like before registration of the request information.

Upon acceptance of the registration of request information issued by the first user, the server apparatus 300 performs the matching process between the user and the vehicle for the first user's shared ride. In the example in FIG. 2, the vehicle 10 is selected as the vehicle which the first user is to ride, from among the vehicles registered in the server apparatus 300. Here, the server apparatus 300 can match up the first user with the vehicle using a publicly known technique. For example, the pieces of information on the vehicles registered in the server apparatus 300 are associated with the respective pieces of identification information related to the drivers of the vehicles. For each vehicle provided for rideshare, a travel schedule of the vehicle is preliminarily registered in the server apparatus 300 by the driver. The server apparatus 300 can then temporarily match up the first user with the vehicle on the basis of the travel schedule of the first user and of the travel schedule of the vehicle registered in the server apparatus 300. The travel schedule of the first user is information related to the time when the first user desires rideshare and to the travel path (the boarding place, the travel destination, etc.), and may be included in request information issued by the first user.

After the temporary matching process described above, the server apparatus 300 notifies the first user of predetermined information pertaining to rideshare (for example, transmission to the user terminal 200). Here, the predetermined information is, for example, information related to the vehicle 10 (the vehicle type, color, vehicle number, etc.), information related to the driver of the vehicle 10 (the gender, age, etc.), information related to the travel (the rendezvous place with the vehicle 10, the scheduled meeting time, the travel path, the scheduled arrival time to the travel destination, presence or absence of another user, the cost for the travel, etc.). The server apparatus 300 notifies the vehicle 10 of information, such as the gender and age of the first user, the rendezvous place desired by the user, the scheduled meeting time, and the travel destination (for example, transmission to the vehicle-mounted device 100). The first user and the vehicle that have obtained the information described above approve the temporary matching result presented by the server apparatus 300, thereby finally determining the matching between the first user and the vehicle 10. Note that in this embodiment, the vehicle that the first user rides is regarded as the first vehicle 10 as a result of the matching process.

As described above, according to the rideshare, the matching process is performed before a time when the boarding in a shared manner is scheduled. The matching process also determines the place where the first user is scheduled to board the first vehicle 10, that is, the rendezvous place for allowing the first user to board the first vehicle 10 in a shared manner. In this case, during travel to the travel destination after the first user's boarding the first vehicle 10 at the rendezvous place, that is, before arrival at the travel destination, the first user is to alight from the first vehicle 10 because of a certain reason. For example, for the first user, circumstances to stop by a predetermined place in the middle of travel to the travel destination occur, and for the first vehicle 10, a temporal margin for escorting the first user to the travel destination is lost owing to the personal circumstances of the driver and the like; such reasons make the first user alight as described above.

Meanwhile, the first user, who is to alight from the first vehicle 10 because of a certain reason as described above, loses the transportation to the travel destination, and is inhibited from travel thereto. To support the travel of the first user, who is to alight from the first vehicle 10, the rideshare system 1 performs a riding vehicle adjusting process that adjusts the riding vehicle. Accordingly, timely matching of another vehicle serving as alternative transportation with the first user having lost transportation because of a certain reason can preferably achieve a travel support for the first user. The details of the riding vehicle adjusting process are described later.

(Hardware configurations) FIG. 2 exemplifies the hardware configurations of the vehicle-mounted device 100 mounted on the vehicle 10, the user terminal 200, and the server apparatus 300. First, the server apparatus 300 is described. The server apparatus 300 has the configuration of a typical computer. The server apparatus 300 includes a processor 301, a main memory unit 302, an auxiliary memory unit 303, and a communication unit 304. These are connected to each other by a bus. The main memory unit 302 and the auxiliary memory unit 303 are computer-readable recording media. The hardware configuration of the computer is not limited to the example depicted in FIG. 2. The components may be appropriately omitted, replaced or added.

The server apparatus 300 causes the processor 301 to load a program stored in the recording medium into a work area of the main memory unit 302 and execute the program, and to control each functional component and the like through execution of the program, thereby allowing a function satisfying a predetermined object to be achieved.

The processor 301 is, for example, a CPU (Central Processing Unit) or a DSP (Digital Signal Processor). The processor 301 controls the server apparatus 300 to perform the operations of various information processes. The main memory unit 302 includes, for example, a RAM (Random Access Memory) and a ROM (Read Only Memory). The auxiliary memory unit 303 is, for example, an EPROM (Erasable Programmable ROM), or a hard disk drive (HDD). The auxiliary memory unit 303 may include a removable medium, i.e., a portable recording medium. The removable medium is, for example, a disk recording medium, such as a USB (Universal Serial Bus) memory, a CD (Compact Disc) or a DVD (Digital Versatile Disc). The auxiliary memory unit 303 stores various programs, various data items and various tables, in the recording medium, in a freely readable and writable manner. The auxiliary memory unit 303 stores an operating system (OS), various programs, various tables, etc. The information stored in the auxiliary memory unit 303 may be stored in the main memory unit 302 instead. Alternatively, the information stored in the main memory unit 302 may be stored in the auxiliary memory unit 303.

The communication unit 304 is connected to another apparatus, and controls communication between the server apparatus 300 and the other apparatus. The communication unit 304 is, for example, a LAN (Local Area Network) interface board, or a wireless communication circuit for wireless communication. The LAN interface board or the wireless communication circuit is connected to the network N1, such as the Internet, which is a public communication network.

A series of processes executed by the server apparatus 300 can be executed by hardware, but can be executed by software instead.

Next, the user terminal 200 is described. The user terminal 200 is, for example, a small computer, such as a smartphone, a mobile phone, a tablet terminal, a personal information terminal, or a wearable computer (a smartwatch etc.). Note that the user terminal 200 may be a personal computer (PC) connected to the server apparatus 300 via the network N1, such as the Internet, which is a public communication network.

The user terminal 200 includes a processor 201, a main memory unit 202, an auxiliary memory unit 203, a display unit 204, an input unit 205, and a communication unit 206. The processor 201, the main memory unit 202, and the auxiliary memory unit 203 are analogous to the processor 301, the main memory unit 302 and the auxiliary memory unit 303 of the server apparatus 300. Accordingly, the description thereof is omitted. The display unit 204 is, for example, a liquid crystal display (LCD), an Electroluminescence (EL) panel or the like. The input unit 205 includes a touch panel, push buttons, etc. Furthermore, the input unit 205 may include a camera that allows videos and images to be input, and a microphone that allows audio to input. The communication unit 206 is, for example, a communication circuit for accessing the network N1 using a mobile communication service (a telephone communication network, such as of mobile phones, or wireless communication, such as WiFi) and for performing data communication with the server apparatus 300 and the like.

Next, the vehicle-mounted device 100 is described. The vehicle-mounted device 100 includes a processing unit 101, a communication unit 102, and a position detecting unit 103. The processing unit 101 is a computer that controls notification about predetermined information to the driver of the vehicle 10, and input of the input information from the driver. The processing unit 101 is made up of a microcomputer, for example. For example, the processing unit 101 can perform a navigation process of notifying the driver in the vehicle 10 of map information around the traveling position and of route information to the destination. For control by the processing unit 101, a predetermined functional component is controlled. This functional component can be achieved by executing a program stored in a memory unit, such as a ROM (Read Only Memory), by a CPU (Central Processing Unit).

The communication unit 102 is, for example, a communication circuit for accessing the network N1 using a mobile communication service and for data communicating with the server apparatus 300 and the like. The vehicle-mounted device 100 (vehicle 10) is connected to the network N1 by the communication unit 102. Information acquired by the communication unit 102 is transmitted to the processing unit 101. The position detecting unit 103 is a device that detects the traveling position of the vehicle 10 and is, for example, a GPS (Global Positioning System) device. The position information on the vehicle 10 detected by the position detecting unit 103 is passed to the processing unit 101, and can be collected by the server apparatus 300 via the communication unit 102.

(Functional Configuration of Server Apparatus)

Figure 3:
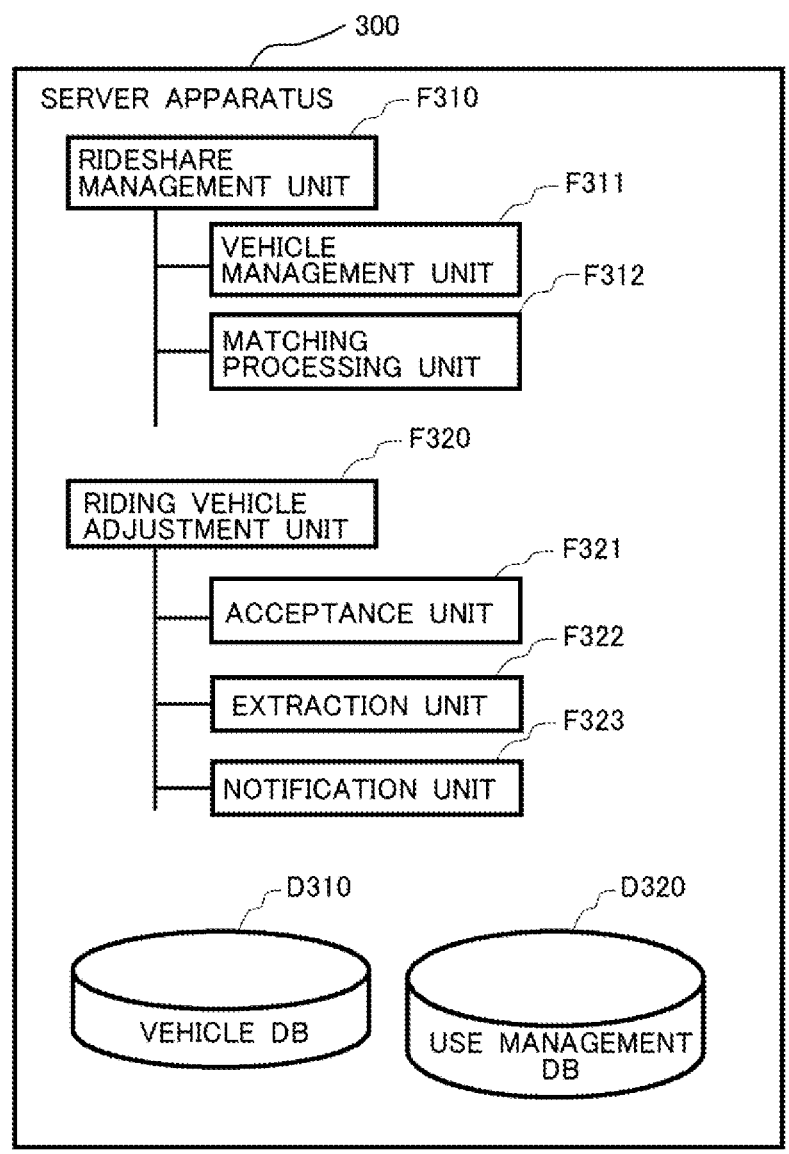
FIG. 3 depicts a functional configuration of a server apparatus that constitutes the rideshare system.

Next, the functional configuration of the server apparatus 300 is described with reference to FIG. 3. The server apparatus 300 includes, as functional components: a rideshare management unit F310; a riding vehicle adjusting unit F320; a vehicle database D310; and a use management database D320. The rideshare management unit F310 includes a vehicle management unit F311, and a matching processing unit F312. The riding vehicle adjusting unit F320 includes an acceptance unit F321, an extraction unit F322, and a notification unit F323. The processor 301 of the server apparatus 300 causes the computer program on the main memory unit 302 to execute the processes of the rideshare management unit F310, the vehicle management unit F311, the matching processing unit F312, the riding vehicle adjusting unit F320, the acceptance unit F321, the extraction unit F322, and the notification unit F323. Note that any of the functional components or a part of the process thereof may be executed by a hardware circuit. The vehicle database D310 and the use management database D320 are constructed through management of data stored in the auxiliary memory unit 303, the management being performed by a program of a database management system (DBMS)

executed by the processor 301. The vehicle database D310 and the use management database D320 are, for example, relational databases.

Note that any of the functional configuration of the server apparatus 300 or a part of the process thereof may be executed by another computer connected to the network N1. For example, each process included in the rideshare management unit F310 and each process included in the riding vehicle adjusting unit F320 may be executed by different computers.

The rideshare management unit F310 obtains request information issued by the user (the first user in this embodiment) requesting a shared ride in any vehicle registered in the server apparatus 300. The vehicle management unit F311 included in the rideshare management unit F310 performs a process of managing the vehicles registered for matching. The matching processing unit F312 performs the matching process between the user and the vehicle. The vehicle management unit F311 generates information related to the vehicle provided for rideshare (vehicle information), and registers the information in the vehicle database D310. The matching processing unit F312 can match up the user with the vehicle using the publicly known technique. Subsequently, the rideshare management unit F310 requests the first user and the driver of the vehicle 10 to approve the matching, as described above. Specifically, the rideshare management unit F310 transmits information related to the approval request to the user terminal 200 of the first user and the vehicle-mounted device 100 of the vehicle 10. Both the approvals of the matching finally determine the matching between the user and the vehicle 10. Furthermore, the rideshare management unit F310 generates information related to rideshare use management (use management information), and registers the information in the use management database D320.

Here, the vehicle database D310 is a database that stores the vehicle information that is on the vehicles provided for rideshare and is managed by the server apparatus 300. The vehicle database D310 includes a vehicle information table depicted in FIG. 4. Note that information stored in the vehicle information table is not limited to the example depicted in FIG. 4. A field can be appropriately added, changed and removed.

The vehicle information table depicted in FIG. 4 includes the fields of the vehicle number, driver ID, vehicle type, traveling schedule, rideshare reservation, execution flag, traveling position, and destination. The vehicle number is identification information for identifying the vehicle, which is a vehicle registered for rideshare. The driver ID is an ID for identifying the driver driving the vehicle. Basically, according to the rideshare by the server apparatus 300, the vehicle is associated with a specific driver. Accordingly, the combination between the vehicle number and the driver ID is fixed. The vehicle type field stores information indicating the type of the vehicle. The field of the traveling schedule stores, for example, schedule information related to the travel of the vehicle, such as the travel destination and the travel route. The schedule information can be used for matching. The rideshare reservation field stores information related to a reservation of rideshare through the vehicle. The information related to rideshare reservation is, for example, information related to the time or place at which a rideshare-user is allowed to board, or information related to the destination to which the user desires to travel or related to the desired arrival time thereto or the like. The execution flag field stores information indicating whether the rideshare is in execution by the vehicle or not. Accordingly, the rideshare reservation field is updated by the rideshare management unit F310 upon issuance of a reservation request by the user. After the reserved rideshare is executed or completed, the reservation information is removed from the rideshare reservation field. The execution field is also updated every time the rideshare by the vehicle is executed or completed.

The traveling position field stores the position information indicating the position where the vehicle is traveling. As for the position information on the vehicle, the position information detected by the position detecting unit 103 included in the vehicle-mounted device 100 of the vehicle is transmitted to the server apparatus 300 via the communication unit 102, thereby allowing the vehicle management unit F311 to update the traveling position field of the corresponding vehicle. The destination field stores the position information indicating the destination of the travel of the vehicle. For example, if the navigation process is executed in the vehicle, the information on the travel destination set for the process is transmitted to the server apparatus 300 via the communication unit 102, thereby allowing the vehicle management unit F311 to update the destination field of the corresponding vehicle. The vehicle management unit F311 may determine the destination of the vehicle on the basis of the traveling schedule field information, and input the destination into the destination field. Note that if the information on the traveling position or the destination is collected in the server apparatus 300 via the network, the transmission interval may be appropriately set in consideration of the communication load of the entire rideshare system 1, the freshness of the information in the vehicle database D310 or the like.

Next, the use management database D320 is described. Here, the use management database D320 is a database that stores the use management information. The use management database D320 includes a management information table depicted in FIG. 5A. Note that information stored in the management information table is not limited to the example depicted in FIG. 5A. A field can be appropriately added, changed and removed.

The management information table depicted in FIG. 5A includes the fields of the driver ID, the user ID, the vehicle number, the place where the user is scheduled to board the vehicle (boarding place), the time when the user is scheduled to board the vehicle 10 (scheduled boarding time), the travel destination of the user, the arrival time desired by the user (desired arrival time), a passenger indicating presence or absence of another passenger at the time of boarding, and a status indicating the status related to the rideshare. The driver ID and the vehicle number are the same as those in the vehicle database. Accordingly, the description thereof is omitted. The user ID is an ID for identifying the user riding in the vehicle. Here, rideshare user information that includes the driver ID and the user ID is further managed by an individual table. The table includes the user's contact destination and the like. The contact destination is, for example, the user's mobile phone number or email address. The driver ID is preliminarily associated with the identification information (vehicle number) on the vehicle in the server apparatus 300.

The information on the fields of the boarding place, scheduled boarding time, travel destination, desired arrival time, and passenger is information that is set by the matching processing unit F312 and is approved by the vehicle and the user. The example depicted in FIG. 5A indicates the use management information during execution of the rideshare depicted in FIG. 1. The use management information indicates that first, a user C001 boards one vehicle identified by a vehicle number X10 at 8:00 at a point f, and a user C002 then boards this vehicle at 8:30 at point h. When the user C001 boards the vehicle, no other users do not ride the vehicle. Accordingly, "ABSENT" is input into the passenger field. On the other hand, when the user C002 boards the vehicle, the user C001 has already been riding the vehicle. Accordingly, "PRESENT" is input into the passenger field. FIG. 5A indicates that the vehicle then travels to the destination point g and allows the user C001 to alight, and further travels to the destination point e and allows the user C002 to alight. As for the vehicle identified by X20, the rideshare is currently performed, and it is scheduled that a user C003 is allowed to board the vehicle at a point p at a time 10:00 and is allowed to travel to a point q. Accordingly, the scheduled arrival time is 11:00. The field of the status stores, for example, status information, such as whether the rideshare is in execution, whether the rideshare has been completed, and whether the rideshare has not been started yet. Consequently, as described above, the example depicted in FIG. 5A means that the rideshare of the users C001 and C002 in the vehicle X10 has been completed, but the rideshare of the user C003 in the vehicle X20 is in execution.

Returning to FIG. 3, the riding vehicle adjusting unit F320 is herein described. Here, if the user riding in the vehicle is to alight from the vehicle as described above in a case where the user is currently riding the rideshare vehicle among the rideshare cases managed by the use management database D320, that is, a case where the status field is "IN EXECUTION," the riding vehicle adjusting unit F320 performs a process for adjusting a combination between the user and a vehicle alternatively provided for the rideshare, together with the acceptance unit F321, the extraction unit F322, and the notification unit F323.

In particular, the acceptance unit F321 accepts an alighting request to cause the user riding in the rideshare vehicle to alight from the vehicle. The alighting request may be issued by the user terminal 200 of the riding user, or issued by the vehicle-mounted device 100 of the vehicle 10 serving as the rideshare vehicle. According to another method, as a result of a process by a predetermined processing apparatus included in the rideshare system 1, the alighting request may be issued to the server apparatus 300 on the basis of information related to the user obtained from the user terminal 200, information related to the vehicle 10 obtained from the vehicle-mounted device 100 and the like. The details of the alighting request accepting process by the acceptance unit F321 are described later.

The extraction unit F322 determines the alighting place where the riding user is allowed to alight, according to the alighting request accepted by the acceptance unit F321, and achieves alighting from the rideshare vehicle, thus bringing the user into a state where the originally specified travel purpose is inhibited. Accordingly, the extraction unit F322 extracts one or more candidate vehicles serving as alternative candidates, in order to achieve the travel purpose. The determination of the alighting place and the extraction of the candidate vehicles by the extraction unit F322 may be those for a place and vehicles that contribute to the user's travel to the travel destination. Accordingly, the alighting place may be determined to extract candidate vehicles as many as possible for the user. According to another method, a place in conformity with the request by the user may be determined as the alighting place. The candidate vehicles are not always extracted with limitation to a mode where the vehicle carries the user directly to the travel destination. The details of the process by the extraction unit F322 are described later.

After the alighting place determined by the extraction unit F322 and the candidate vehicles extracted by this unit are approved by the user, the notification unit F323 issues a notification for requesting the user's reboarding the second vehicle that is one of the candidate vehicles, on the basis of the approval result. After the user is approved to board by the second vehicle upon acceptance of this notification, the riding vehicle adjusting unit F320 reflects the user's alighting and the user's boarding the second vehicle, in the use management database D320. For example, if the user C003 is to alight from the vehicle X20 and to reboard another vehicle according to the matching between the vehicle X20 and the user C003 illustrated in a use management information table depicted in FIG. 5A, the management information table depicted in FIG. 5A is updated to a management information table depicted in FIG. 5B by the riding vehicle adjusting unit F320. That is, "MIDTERM CANCELLATION" is input into the status field of a record of matching between the vehicle X20 and the user C003, and a record related to matching between a new vehicle (a vehicle X30 serving as a second vehicle) and the user C003 is added. Immediately after the addition, the vehicle X30 has not allowed the user C003 to board yet. Accordingly, the input in the status field of the thus added record is "INCOMPLETE." However, after the user C003 boards the vehicle X30, the input in the status field becomes "IN EXECUTION."

(Flow of Processes)

Figure 6:
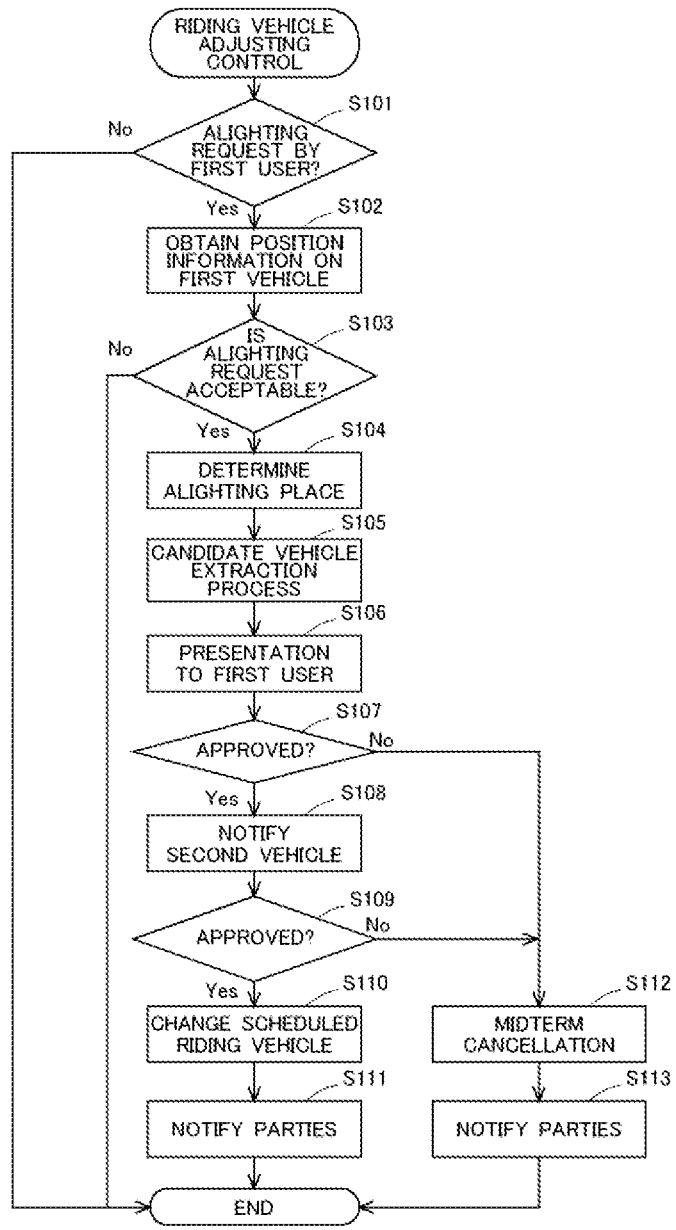
FIG. 6 is a first flowchart of riding vehicle adjustment control executed by the server apparatus.
Figure 7:
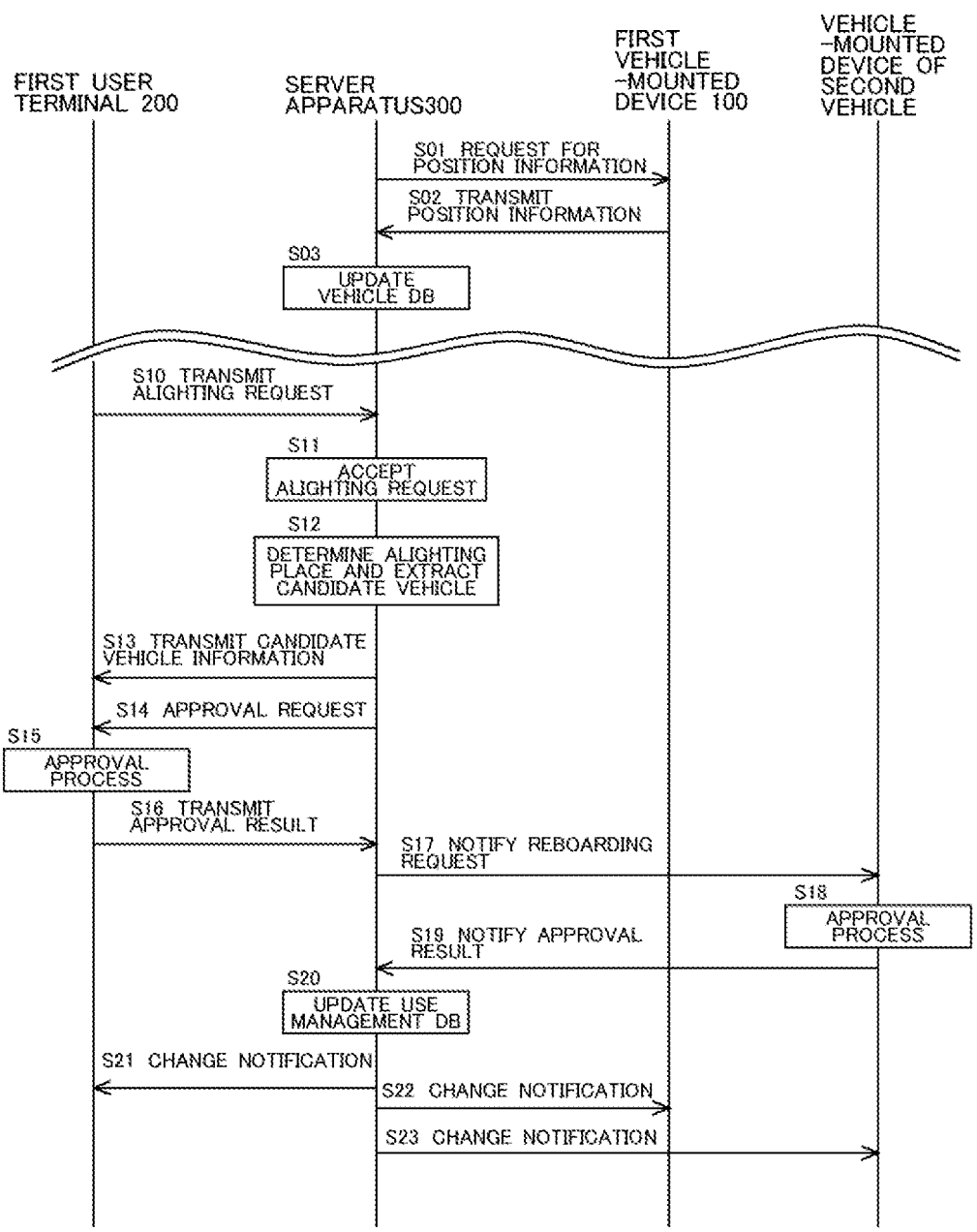
FIG. 7 is a first diagram depicting a flow of processes between a user terminal, a server apparatus, and vehicle-mounted devices of related vehicles when the riding vehicle adjustment control is performed.

As for the rideshare system 1 of this embodiment, the flow of processes (hereinafter, also called "riding vehicle adjusting process") for readjusting the combination between the user and the vehicle to address alighting from the rideshare vehicle by the user riding in the rideshare vehicle, is described with reference to FIGS. 6 and 7. In this embodiment, the riding vehicle adjusting process is executed by the riding vehicle adjusting unit F320, and the acceptance unit F321, the extraction unit F322 and the notification unit F323, which are included in the unit F320. The flow of the process is illustrated in the flowchart of FIG. 6. The adjusting method illustrated therein is an example of the riding vehicle adjusting method. FIG. 7 depicts the flow of processes between the user terminal 200, the server apparatus 300, and the vehicle-mounted device of the related vehicle during execution of the riding vehicle adjustment control by the riding vehicle adjusting unit F320. Note that in the following description of embodiments, the vehicle which the user is to board as a result of the matching process by the matching processing unit F312 is adopted as the first vehicle 10, and the vehicle-mounted device mounted thereon is adopted as the first vehicle-mounted device 100. The user riding in the first vehicle 10 is called the first user, and his/or her user terminal is adopted as the first user terminal 200.

The riding vehicle adjustment control depicted in FIG. 6 is repetitively executed at predetermined time intervals for each combination between the vehicle and the user corresponding to a rideshare record for which rideshare is in execution (i.e., a record where a status field of the management information table is "IN EXECUTION") in the use management information managed by the use management database D320. In this embodiment, the combination is called "adjustment target combination." For example, based on the information management table depicted in FIG. 5A, the combination between the vehicle X20 and the user C003 is regarded as the adjustment target combination. The riding vehicle adjustment control is performed for the adjustment target combination. In this case, the vehicle X20 is adopted as the first vehicle 10, and the user C003 is adopted as the first user.

FIG. 7 depicts, in addition to exchange between devices during execution of the riding vehicle adjustment control, also collection of information related to the vehicle of the adjustment target combination by the server apparatus 300, that is, the flows of the process of obtaining the position information on the first vehicle 10. In S01, the server apparatus 300 transmits a request signal for the position information on the first vehicle 10 to the vehicle-mounted device 100 of the first vehicle 10. In S02, the vehicle-mounted device 100 having received the request signal issues a response about the position information detected by the position detecting unit 103 to the server apparatus 300. Note that the collection of the information related to the first vehicle 10 is performed by the vehicle management unit F311 as described above. The position information on the first vehicle 10 is stored in the traveling position field of the vehicle information table. The collection of the position information is executed at predetermined time intervals. At every execution, the stored position information is updated.

The riding vehicle adjustment control depicted in FIG. 6 is herein described. First, in S101, it is determined whether the alighting request is issued by the first user or not. The alighting request is issued by the first user terminal 200 and delivered to the server apparatus 300 via the network N1. A case can occur where in the middle of the first user's enjoying the rideshare service by the first vehicle 10 and traveling to the travel destination, the travel itself to the originally specified travel destination is continued but the first user considers to alight from the first vehicle 10 because of a certain reason, such as occurrence of something to do. In such a case, the first user executes a predetermined application on the first user terminal 200, and transmits a request to "alight from the first vehicle 10" (that is, an alighting request) to the server apparatus 300 through input from the input unit 205 (corresponding to a process illustrated as "TRANSMIT ALIGHTING REQUEST" in S10 of FIG. 7). The first user may include, in the alighting request, information on a place (alighting place) where he/she request to alight. Note that as described later, at this time, the first user is not always allowed to alight from the first vehicle 10 at the alighting place that he/she requests. If it is affirmatively determined in S101, the processing proceeds to S102. If it is negatively determined in S101, this control is finished.

Next, in S102, the riding vehicle adjusting unit F320 obtains the position information on the first vehicle 10 from the vehicle information table. Subsequently, in S103, it is determined whether the alighting request by the first user is acceptable or not, on the basis of the information that is on the alighting place requested by the first user and is included in the alighting request received by the server apparatus 300, and the position information on the first vehicle 10 obtained in S102. The determination process is performed by the acceptance unit F321. If the alighting place requested by the first user is a place where the first vehicle 10 has already passed or a place largely apart from the route to the travel destination, the driving condition is subjected to a relatively heavy load for the driver of the first vehicle 10, which is not preferable in some cases. Accordingly, in view of the load on the first vehicle 10 with respect to the first user's alighting, the determination process of S103 is performed. For example, if the current position of the first vehicle 10 is a place at which this vehicle has already passed the first user's requested alighting place and is a predetermined distance or more therefrom, it may be considered that the load on the first vehicle 10 is heavy and it may be determined that the alighting request is unacceptable.

If it is affirmatively determined in S103, the acceptance unit F321 accepts the alighting request issued by the first user, and the processing proceeds to S104. On the contrary, if it is negatively determined in S103, acceptance of the alighting request by the acceptance unit F321 is not performed, and this control is finished. Note that in this embodiment, the acceptance unit F321 directly determines whether the acceptance of the alighting request is allowed or not, as depicted in FIG. 6. Alternatively, the acceptance unit F321 having received the alighting request may request the first vehicle 10 (vehicle-mounted device 100) to determine whether the acceptance is allowed or not. In this case, the determination result by the first vehicle 10 is "ACCEPTABLE," the acceptance unit F321 accepts the alighting request issued by the first user. The process related to S103 depicted in FIG. 6 is illustrated as the alighting request accepting process, which is the process of S11 in FIG. 7.

Next, in S104, the extraction unit F322 determines the alighting place where the first user is allowed to alight, according to the accepted alighting request. In this embodiment, the alighting request includes information related to the alighting place requested by the first user, and the alighting request is determined to be acceptable in S103. Accordingly, the extraction unit F322 determines the alighting place related to this information, that is, the place requested by the first user for alighting, as the alighting place where the first user is actually allowed to alight. After the process of S104 is finished, the processing proceeds to S105.

Subsequently, in S105, the candidate vehicle extraction process is performed by the extraction unit F322 in the same manner. Here, the candidate vehicle is a rideshare vehicle that supports the first user, who is to alight according to the alighting request, to travel subsequently to the travel destination. The candidate vehicle is a rideshare vehicle that allows the first user to board at a place identical to the alighting place where the first user is allowed to alight, or a place adjacent to the alighting place. Accordingly, if the boarding place is different from the alighting place, it is preferable to set the boarding place in consideration of the first user's convenience and in view of a time period by foot from the alighting place to the boarding place. For example, the boarding place may be a place within a three-minute walk from the alighting place. The extraction unit F322 extracts one or more vehicles as candidate vehicles from among the vehicles that are registered in the vehicle database D310 and are provided for rideshare.

Figure 8:
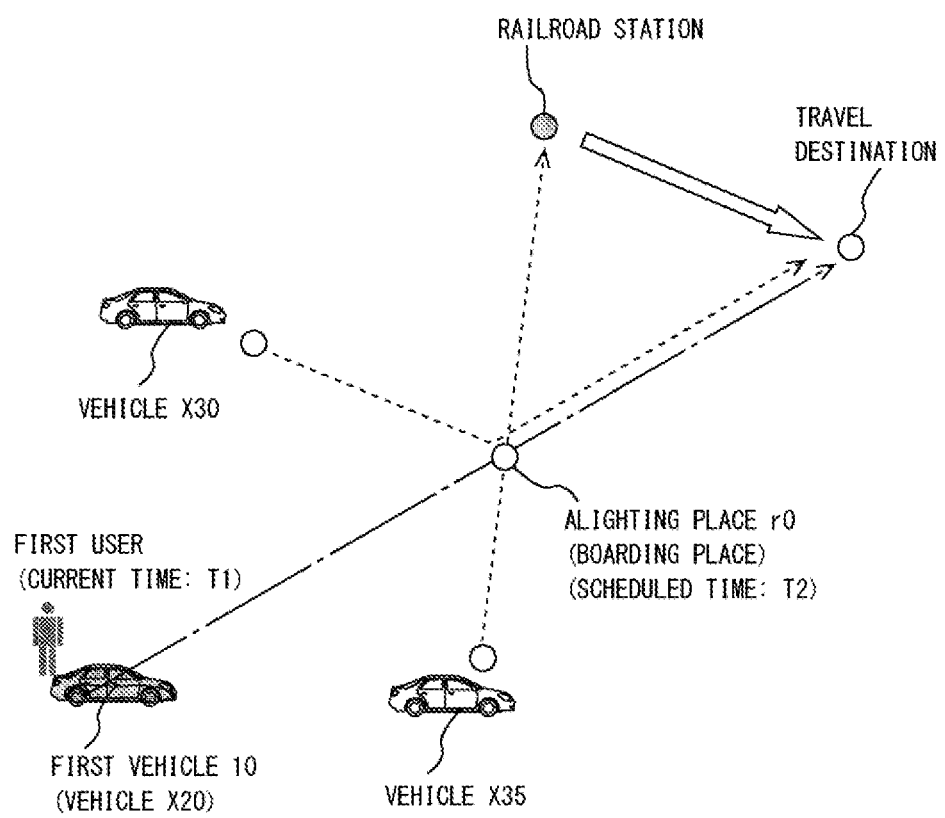
FIG. 8 is a first diagram for illustrating a method of determining an alighting place and extracting a candidate vehicle performed by the riding vehicle adjustment control.

Here, the extraction of the candidate vehicles by the extraction unit F322 is described with reference to FIG. 8. FIG. 8 schematically depicts the positions of the first user and the first vehicle 10 at a current time T1, an alighting place r0 of the first user, and a travel destination that is a scheduled travel destination of the first user through rideshare. The scheduled arrival time of the first vehicle 10 at the alighting place r0 is T2. The scheduled arrival time T2 can be calculated on the basis of information on the current position of the first vehicle 10, the distance from the current position to the alighting place, the traffic situations on the route and the like.

FIG. 8 depicts two extraction modes. In the first extraction mode, the extraction unit F322 extracts the vehicle that allows the first user to board the vehicle at the boarding place around the scheduled time T2 from among the vehicles registered in the vehicle database D310. Note that in this embodiment, the boarding place is a place coinciding with the alighting place r0. Specifically, the extraction unit F322 temporarily extracts the vehicles that are determined as vehicles without any reservation provided for rideshare at the scheduled time T2 from the information on the rideshare reservation field of the vehicle information table depicted in FIG. 4 and are determined as vehicles not provided currently for rideshare from the information on the execution flag field of the vehicle information table. Furthermore, in consideration of the input information in the traveling position field and the input information in the destination field, vehicles that can reach the boarding place at the scheduled time T2 or therearound and can travel to the travel destination of the first user are extracted as the candidate vehicles from among the temporarily extracted vehicles. For example, the vehicle X30 depicted in FIG. 8 has the same destination as the travel destination of the first user. The time when the vehicle X30 is expected to reach the boarding place from the current position can be a time around the scheduled time T2. Accordingly, the extraction unit F322 can extract the vehicle X30 as the candidate vehicle. Note that a calculation method analogous to the method of calculating the scheduled time T2 described above is applicable to calculation of the expected arrival time of the vehicle X30 at the boarding place.

In the second extraction mode depicted in FIG. 8, the extraction unit F322 extracts the vehicle that allows the first user to board the vehicle at the boarding place at the scheduled time T2 or therearound from among the vehicles registered in the vehicle database D310. Specifically, the extraction unit F322 temporarily extracts the vehicles that are determined as vehicles without any reservation provided for rideshare at the scheduled time T2 from the information on the rideshare reservation field of the vehicle information table depicted in FIG. 4 and are determined as vehicles not provided currently for rideshare from the information on the execution flag field of the vehicle information table. Furthermore, in consideration of the input information in the traveling position field and the input information in the destination field, vehicles which can reach the boarding place at the scheduled time T2 or therearound and which can travel to a predetermined alighting place that is different from the travel destination of the first user and can allow travel to the travel destination by another transportation (e.g., a railroad, bus, etc.) are extracted as candidate vehicles from among the temporarily extracted vehicles. The predetermined alighting place is a place for allowing the first user to alight the rideshare vehicle and board another transportation. For example, a railroad station, a bus stop, etc. can be exemplified. For example, the vehicle X35 depicted in FIG. 8 has a destination that is a railroad station allowing the first user to travel to the travel destination. The time when the vehicle X35 is expected to reach the boarding place from the current position can be a time around the scheduled time T2. Accordingly, the extraction unit F322 can extract the vehicle X35 as the candidate vehicle. Note that a calculation method analogous to the method of calculating the scheduled time T2 described above is applicable to calculation of the expected arrival time of the vehicle X35 at the boarding place. As described above, according to the second extraction mode, the first user is not allowed to travel in the rideshare vehicle directly to the travel destination, but can travel to the travel destination as a result. Accordingly, the travel to the travel destination by the first user, who is to lose the transportation according to the alighting request, can be more preferably supported.

Figure 9:
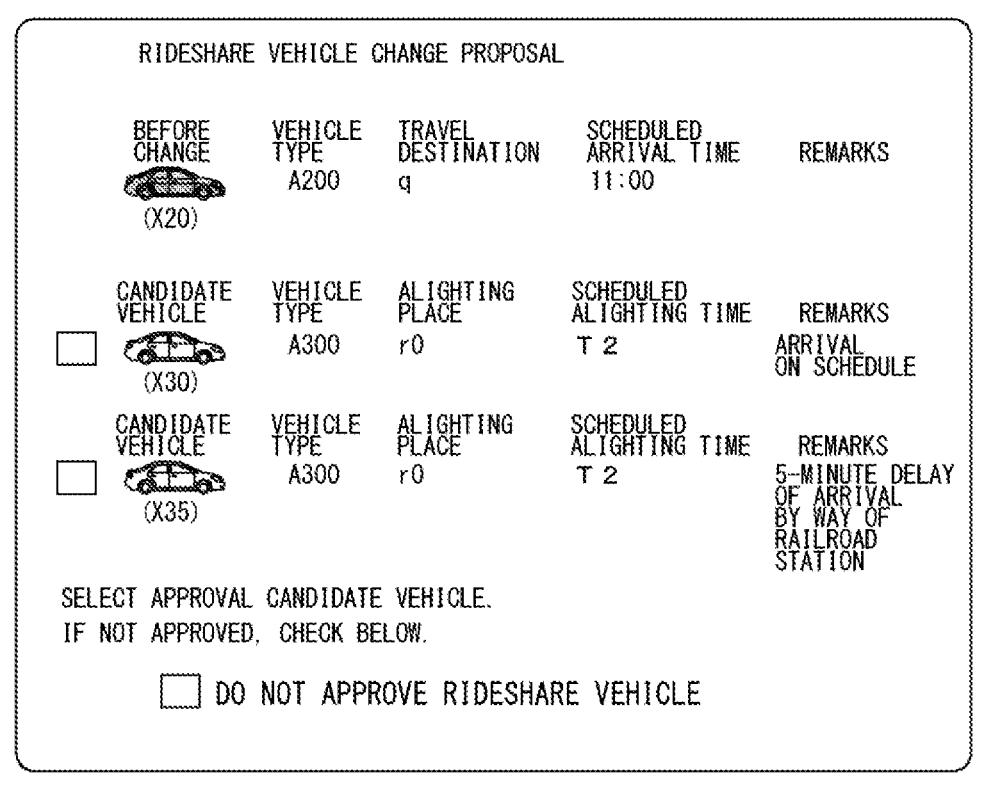

Note that the processes of S104 and S105 depicted in FIG. 6 are illustrated as the process of S12 in FIG. 7, that is, the process of determining the alighting place and extracting the candidate vehicles. Next, the process of S106 is described. In S106, the riding vehicle adjusting unit F320 presents the candidate vehicles extracted by the process of S105, to the first user terminal 200 of the first user. FIG. 9 depicts an example of a list of the candidate vehicles displayed on the display unit 204 of the first user terminal 200. In the display example depicted in FIG. 9, the vehicle type, the travel destination, the scheduled arrival time, and other related information (remark information), which are pieces of information related to the first vehicle 10 (vehicle X20) where the first user is riding, are displayed in an upper area. Furthermore, the vehicle type, the alighting place, the scheduled alighting time, and the remarks, which are pieces of information related to each extracted candidate vehicle, are displayed therebelow. Specifically, the related information on the vehicle X20, which is the first vehicle 10, is displayed in the upper area, where the first user can identify the scheduled arrival time when the first user rides the first vehicle 10 without alighting. The pieces of related information on the candidate vehicles X30 and X35 extracted in the first and second extraction modes are sequentially displayed therebelow. The first user can identify that the alighting place of the candidate vehicle X30 is r0 as requested, and the scheduled arrival time at the travel destination is the originally specified time even if the vehicle is changed to the candidate vehicle X30. The first user can identify that the alighting place of the candidate vehicle X35 is r0 as requested, but the candidate vehicle X35 does not travel to the travel destination but travels to a railroad station instead. Furthermore, it can also be identified that if the first user travels in the candidate vehicle X35 by way of the railroad station, the scheduled arrival time at the travel destination is an arrival time with 5-minute delay from the originally specified scheduled time. Note that the information on the candidate vehicles presented to the first user may be information on the candidate vehicles extracted according to at least one extraction mode among the first and second extraction modes. Note that the process of S106 depicted in FIG. 6 is illustrated as a process of transmitting the candidate vehicle information, that is, the process of S13, and as a process for an approval request, that is, the process of S14, in FIG. 7.

The first user, for whom such candidate vehicles are presented, is to issue a response about whether to approve the presented candidate vehicles or not in consideration of the approval request transmitted from the server apparatus 300 in S14 (the approval process in S15 depicted in FIG. 7). Specifically, the first user operates a checkbox disposed corresponding to each candidate vehicle through the input unit 205 of the first user terminal 200, specifically, on the display unit 204 that is a touch panel, to approve the candidate vehicle desired to be changed from the first vehicle 10, thus expressing an intention of approving the change in rideshare vehicle. Note that in a case where the first user does not approve the candidate vehicle presented, the checkbox corresponding to a display of "Do not approve rideshare vehicle" displayed at the bottom of the display unit 204 is operated, thus expressing an intention of a denial of approval. A candidate vehicle approval response by the first user as described above is transmitted from the first user terminal 200 to the server apparatus 300 (an approval result transmission process in S16 depicted in FIG. 7).

The description is returned to the riding vehicle adjustment control in FIG. 6. After the process of S106, it is determined whether the candidate vehicle is approved by the first user or not in S107. Specifically, based on each of the approval results transmitted back to the server apparatus 300 in S16 of FIG. 7, the determination in S107 is performed. If it is affirmatively determined in S107, the processing proceeds to S108. If it is negatively determined, the processing proceeds to S112.

Here, if it is affirmatively determined in S107, the vehicle approved by the first user serves as a second vehicle that allows the first user to board subsequently. In S108, the notification unit F323 of the server apparatus 300 issues a notification for requesting the first user's reboarding at the boarding place to the vehicle-mounted device of the second vehicle (a process of reboarding request notification in S17 depicted in FIG. 7). The vehicle-mounted device of the second vehicle having received this notification is to issue a response of whether or not it is approved to allow the first user to board at the designated boarding place and carries him/her to the travel destination (an approval process of S18 depicted in FIG. 7). Specifically, the driver of the second vehicle responds with an approval result through operation of the input unit of the vehicle-mounted device. Such a response of the approval result from the second vehicle is transmitted from the vehicle-mounted device to the server apparatus 300 (an approval result transmission process of S19 depicted in FIG. 7). Next, in S109, it is determined whether the first user's reboarding is approved by the second vehicle or not. Specifically, based on each approval result transmitted back to the server apparatus 300 in S19 of FIG. 7, the determination in S109 is performed. If it is affirmatively determined in S109, the processing proceeds to S110. If it is negatively determined, the processing proceeds to S112. In this embodiment, if any of the candidate vehicles X30 and X35 is selected and approved by the first user, and the first user's reboarding is approved by the selected vehicle, the processing proceeds to S110. On the contrary, if both the candidate vehicles are denied by the first user, or the first user's reboarding is denied by the candidate vehicle selected by the first user, the processing proceeds to S112.

In S110, the riding vehicle adjusting unit F320 changes the first user's riding vehicle from the first vehicle 10 to the approved second vehicle. Specifically, as depicted in FIG. 5B, the riding vehicle adjusting unit F320 changes the status field of the originally specified record that combines the first user with the first vehicle 10 in the management information table in the use management database D320 from "IN EXECUTION" to "MIDTERM CANCELLATION," and newly generates a record that combines the approved second vehicle with the first user. The process of S110 is illustrated as the process of S20 in FIG. 7, that is, the process of updating the use management database D320. Subsequently, in S111, a notification about the change in the riding vehicle accompanying alighting is issued to the parties related to the first user's rideshare, that is, each of the first user, the first vehicle 10 and the second vehicle. Specifically, information on a notification about the content of change is transmitted to the first user terminal 200 of the first user, the vehicle-mounted device 100 of the first vehicle 10, and the vehicle-mounted device of the second vehicle (a process of change notification in S21, S22 and S23 in FIG. 7).

On the other hand, in S112, the first user's alighting from the first vehicle 10 is reflected in the use management database D320. Specifically, the riding vehicle adjusting unit F320 changes the status field of the originally specified record that combines the first user with the first vehicle 10 in the management information table in the use management database D320 from "IN EXECUTION" to "MIDTERM CANCELLATION." Subsequently, in S113, the first user, who is a party related to the process of S112, is notified that reboarding by new rideshare after alighting is not performed. The first vehicle 10 is notified that the first user is allowed to alight at the requested alighting place.

As described above, according to the riding vehicle adjustment control depicted in FIG. 6, if the alighting request is issued by the first user, adjustment of matching for rideshare can extract the candidate vehicle for the first user after alighting and preferably support the first user's travel to the travel destination.

Second Embodiment

Figure 10:
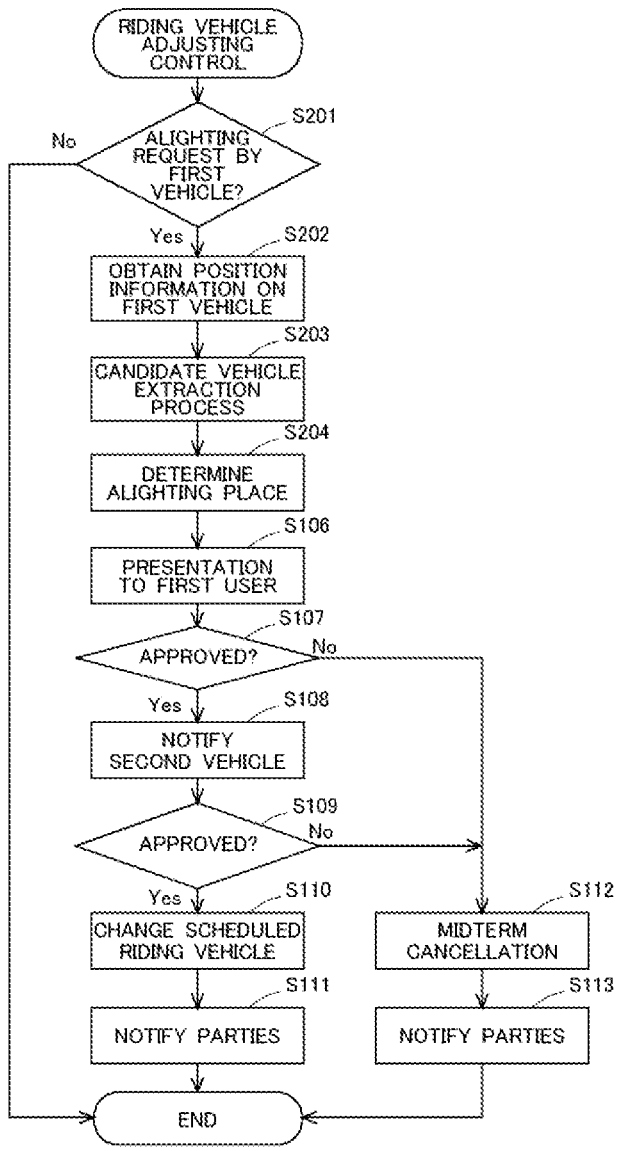
FIG. 10 is a second flowchart of the riding vehicle adjustment control executed by the server apparatus.
Figure 11:
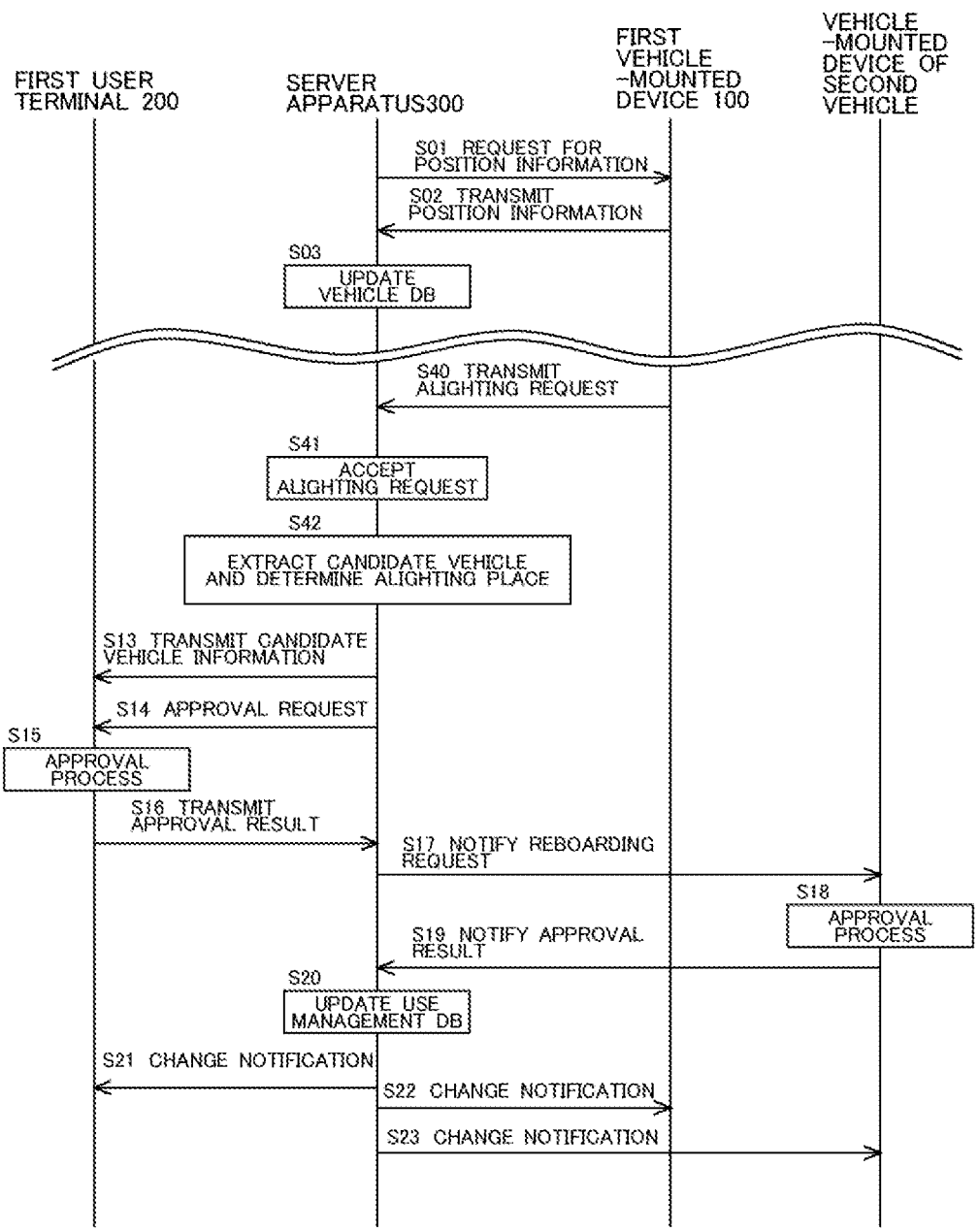
FIG. 11 is a second diagram depicting a flow of processes between a user terminal, a server apparatus, and vehicle-mounted devices of related vehicles when the riding vehicle adjustment control is performed.

A second embodiment of the rideshare system 1 is described with reference to FIG. 10. FIG. 10 depicts the flow of the riding vehicle adjustment control according to this embodiment. Among the processes included in the riding vehicle adjustment control depicted in FIG. 10, the same processes as the processes of the riding vehicle adjustment control depicted in FIG. 6 are assigned the same reference numerals, and the detailed description thereof is omitted. The riding vehicle adjustment control according to this embodiment performs the processes of S201 to S204 instead of the processes of S101 to S105 depicted in FIG. 6. FIG. 11 depicts exchange between apparatuses and devices related to the riding vehicle adjustment control depicted in FIG. 10 (exchange among the first user terminal 200, the server apparatus 300, and each vehicle-mounted device).

First, in S201, it is determined whether the alighting request is issued by the first vehicle 10 or not. The alighting request is issued by the vehicle-mounted device 100 mounted on the first vehicle 10 and delivered to the server apparatus 300 via the network N1. In the middle of the first user's travel in the first vehicle 10 through the rideshare service, it can sometimes be considered that the first user's travel is terminated owing to the circumstances of the first vehicle 10 and allows the first user to alight. In such a case, the driver of the first vehicle 10 accesses the server apparatus 300 from the vehicle-mounted device 100, and transmits a request to "allow the first user to alight" (that is, an alighting request) to the server apparatus 300 (corresponding to a process illustrated as "TRANSMIT ALIGHTING REQUEST" in S40 of FIG. 11). Upon affirmative determination in S201, the acceptance unit F321 accepts the alighting request issued by the first vehicle 10 (corresponding to a process illustrated as "ACCEPT ALIGHTING REQUEST" in S41 of FIG. 11), the processing proceeds to S202. If it is negatively determined in S201, this control is finished.

Next, in S202, the riding vehicle adjusting unit F320 obtains the position information on the first vehicle 10 from the vehicle information table. Subsequently, in S203, according to the accepted alighting request, the candidate vehicle extraction process is performed by the extraction unit F322. Here, the candidate vehicle is a rideshare vehicle that supports the first user, who is to alight according to the alighting request, to travel subsequently to the travel destination. If the first user is allowed to alight owing to the circumstances of the first vehicle 10 as in this embodiment, it is preferable to allow the first user to board the next rideshare vehicle quickly after alighting, for the sake of the first user's travel to the travel destination.

Upon acceptance of the alighting request, the extraction unit F322 extracts candidate vehicles that allow the first user to ride, on the basis of information on the position of the first vehicle 10 and obtainable information related to the travel of the vehicle other than the first vehicle 10, that is, information included in the vehicle information table registered in the vehicle database D310. Specifically, the extraction unit F322 extracts vehicles which are within a predetermined first range from the position of the first vehicle 10 and of which the travel destinations are the first user's travel destination or a place adjacent thereto and which have a possibility of passing through the first user's travel destination or the place adjacent thereto in the middle of the travel, from among the vehicles registered in the vehicle database D310. More specifically, the extraction unit F322 temporarily extracts vehicles that are determined as vehicles without any reservation provided for rideshare from the current time to the scheduled arrival time at the first user's travel destination from the information on the rideshare reservation field of the vehicle information table depicted in FIG. 4 and are determined as vehicles not provided currently for rideshare from the information on the execution flag field of the vehicle information table. Furthermore, based on the input information in the traveling position field, vehicles that are present in the predetermined first range from the position of the first vehicle 10 are extracted. In consideration of the convenience of the first user, it is preferable that the boarding place of the first user into the candidate vehicle coincide with the alighting place where the first user be allowed to alight. To relatively facilitate access from the first vehicle 10 to the candidate vehicle, the candidate vehicle is extracted in a condition of being present within the predetermined first range from the position of the first vehicle 10. Furthermore, to carry the first user in the candidate vehicle to the travel destination or the place adjacent thereto, the candidate vehicles are narrowed down in consideration of input information in the destination field and the traveling schedule field of the vehicle information table.

Next, in S204, likewise, the extraction unit F322 determines the alighting place where the first user is allowed to alight. In this embodiment, the alighting request is issued by the first vehicle 10 as described above. Accordingly, in consideration of route information on the travel schedule of the candidate vehicle, the alighting place is determined so as to allow the first user to board the candidate vehicle at the alighting place. That is, the first vehicle 10 accesses the candidate vehicle traveling on the route, and the alighting place is determined so that the alighting place of the first vehicle 10 can coincide with the boarding place into the candidate vehicle. The scheduled travel route of the candidate vehicle is obtained from input information on the traveling schedule in the vehicle information table.

Figure 12:
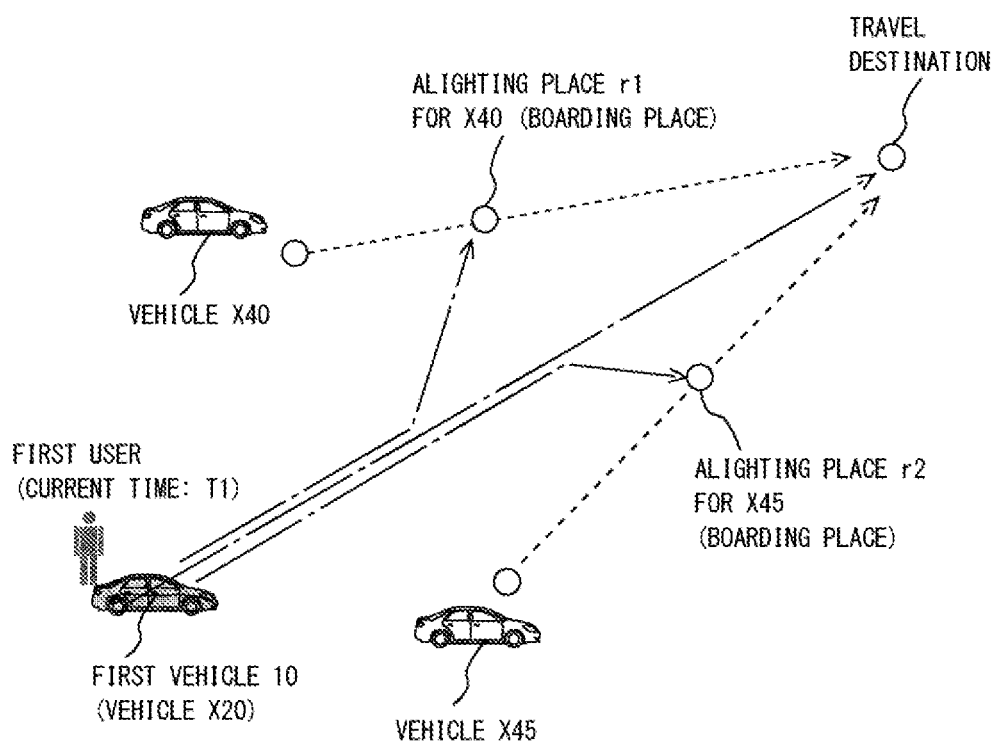
FIG. 12 is a second diagram for illustrating a method of determining the alighting place and extracting the candidate vehicle performed by the riding vehicle adjustment control.

Here, the determination of the alighting place by the extraction unit F322 is described with reference to FIG. 12. FIG. 12 schematically depicts the positions of the first user and the first vehicle 10 at the current time T1, and the travel destination that is the scheduled travel destination of the first user through rideshare. It is assumed that two candidate vehicles X40 and X45 are extracted in S203. Each of these candidate vehicles is a vehicle traveling toward the first user's travel destination. However, the route toward the travel destination is different from the route scheduled for the first vehicle 10.

For example, an alighting place r1 for allowing the first user to board a candidate vehicle X40 is determined as a place allowing the first vehicle 10 at the current position to access the candidate vehicle X40 on the scheduled travel route. Specifically, if the first vehicle 10 can arrive from the current position by the scheduled arrival time of the candidate vehicle X40 at a predetermined place on the scheduled travel route, the predetermined place is determined as the alighting place. The scheduled arrival time of each vehicle can be calculated on the basis of information on the current position of each vehicle, the distance from the current position to the predetermined place, the traffic situations on the route and the like. In this embodiment, the alighting place for allowing the first user to board the candidate vehicle X40 is regarded as r1, and the alighting place allowing the first user to board the candidate vehicle X45 is regarded as r2 according to an analogous determination method.

Note that the processes of S203 and S204 depicted in FIG. 10 are illustrated as the process of S42 in FIG. 11, that is, the process of extracting the candidate vehicles and determining the alighting place. After the process of S204 is finished, the processes of S106 and thereafter are performed. The processes of S106 and thereafter are as described in the first embodiment. Accordingly, the detailed description thereof is omitted. As described above, according to the riding vehicle adjustment control depicted in FIG. 10, if the alighting request is issued by the first vehicle 10, adjustment of matching for rideshare can extract the candidate vehicle for the first user after alighting, determine the alighting place, and suitably support the first user's travel to the travel destination.

In this embodiment, as described above, the candidate vehicles that can carry the first user to the travel destination or the place adjacent thereto are extracted. Alternatively, as described in the first embodiment, the candidate vehicles that can carry the first user to a predetermined alighting place, such as a railroad station, may be extracted. Accordingly, the candidate vehicles as many as possible can be presented to the first user. This contributes to the purpose of supporting the first user's travel.

Third Embodiment

Figure 13:
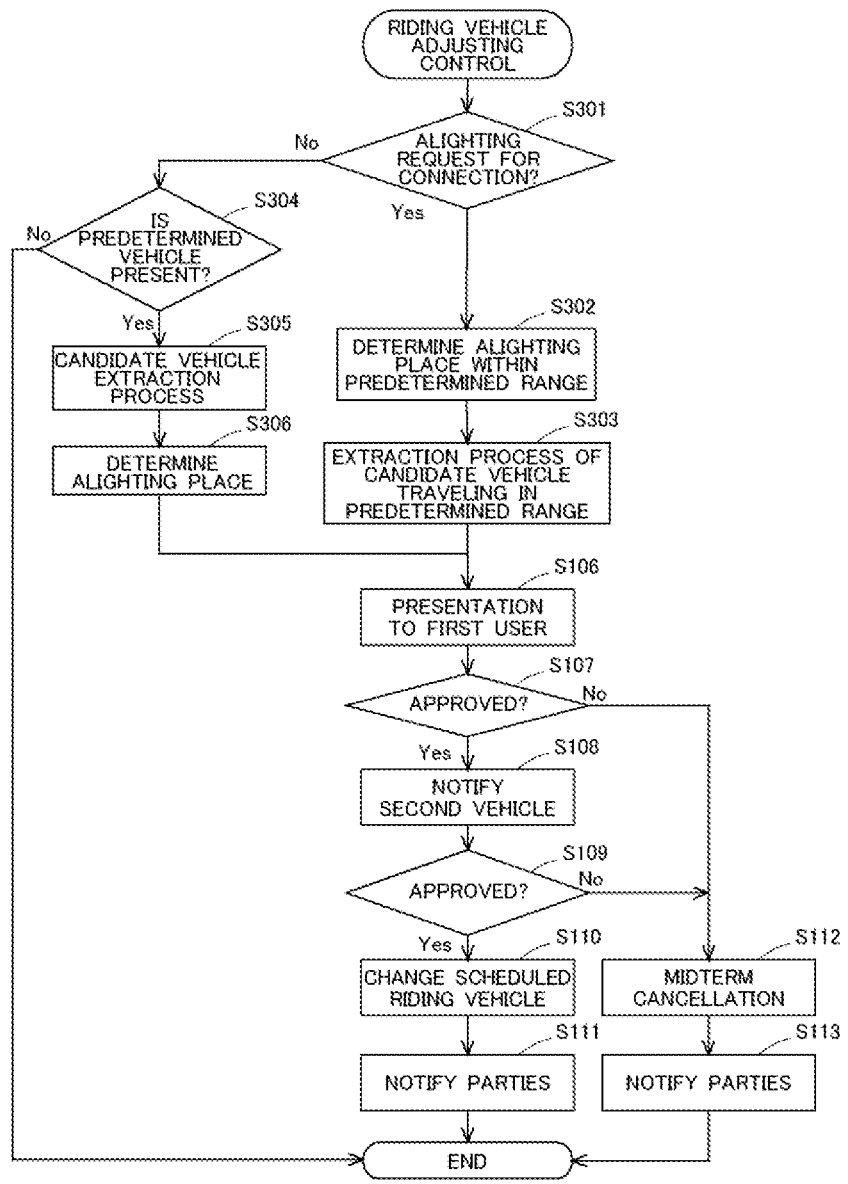
FIG. 13 is a third flowchart of the riding vehicle adjustment control executed by the server apparatus.
Figure 14:
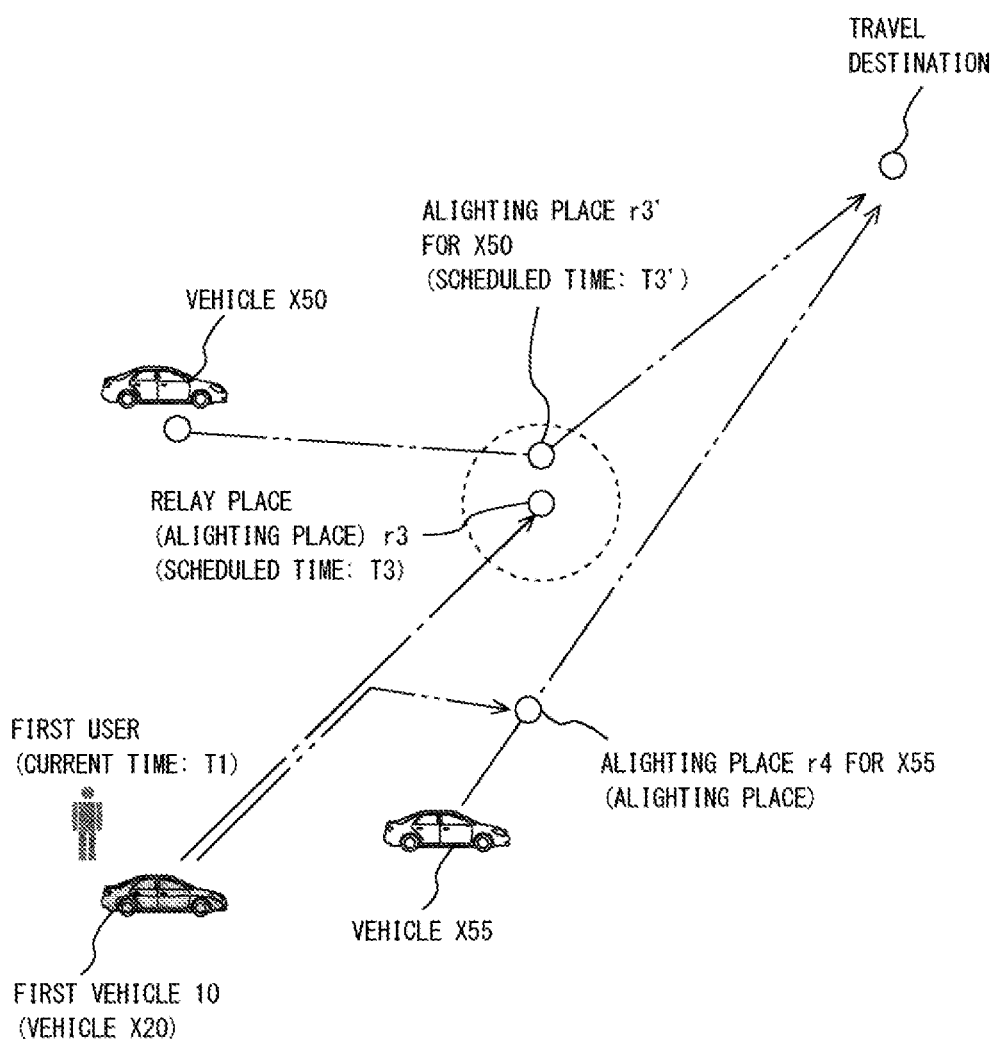
FIG. 14 is a third diagram for illustrating a method of determining the alighting place and extracting the candidate vehicle performed by the riding vehicle adjustment control.

A third embodiment of the rideshare system 1 is described with reference to FIG. 13. FIG. 13 depicts the flow of the riding vehicle adjustment control according to this embodiment. Among the processes included in the riding vehicle adjustment control depicted in FIG. 13, the same processes as the processes of the riding vehicle adjustment control depicted in FIG. 6 are assigned the same reference numerals, and the detailed description thereof is omitted. The riding vehicle adjustment control according to this embodiment performs the processes of S301 to S306 instead of the processes of S101 to S105 depicted in FIG. 6. FIG. 14 illustrates the situations of the first user and the rideshare vehicle in this embodiment. In this embodiment, the first user has an object to travel to the travel destination in the rideshare vehicle, but is unable to ride the rideshare vehicle directly toward the travel destination because the travel destination is at a relatively remote place, and is in a state of riding the first vehicle 10 having a travel destination that is a relay place residing in the middle of the route toward the travel destination instead. Accordingly, the first user is riding the first vehicle 10 in a state where the transportation from the relay place to the travel destination is undetermined. FIG. 14 schematically depicts the positions of the first user and the first vehicle 10 at the current time T1, a relay place r3, and a travel destination that is a scheduled travel destination of the first user through rideshare.

Hereinafter, the riding vehicle adjustment control depicted in FIG. 13 is described. A case where the current position of the first vehicle 10 belongs to an area within a predetermined range from the relay place during the first user's riding the first vehicle 10 (in the area encircled by a broken line in FIG. 14) means that the first user has alighted from the first vehicle 10 and the timing of searching for the next rideshare vehicle to travel to the travel destination and achieving rideshare vehicle connection is coming. Accordingly, in S301, it is determined whether an alighting request for rideshare vehicle connection has been issued or not. The alighting request is issued by the vehicle-mounted device 100 on the basis of the position of the first vehicle 10 and delivered to the server apparatus 300 via the network N1. Alternatively, according to another method, the first user rides the first vehicle 10 and the positions of both the parties coincide with each other. Consequently, based on the position of the first user detectable by the first user terminal 200, the alighting request may be issued by the first user terminal 200 and delivered to the server apparatus 300 via the network N1. If it is affirmatively determined in S301, the acceptance unit F321 accepts the alighting request, and the processing proceeds to S302. On the contrary, if it is negatively determined in S301, the processing proceeds to S394, but the alighting request is not accepted by the acceptance unit F321.

Next, the processes of S302 and S303 after the affirmative determination in S301 are described. That is, determination of the alighting place and extraction of candidate vehicles by the extraction unit F322 when the first vehicle 10 comes into the predetermined range from the relay place are described. First, in S302, the extraction unit F322 determines the alighting place where the first user is allowed to alight, according to the accepted alighting request. In this embodiment, in consideration of the first user's traveling in the first vehicle 10 toward the relay place r3, the extraction unit F322 determines the relay place r3 as the alighting place. Alternatively, according to another method, the extraction unit F322 may determine a predetermined place within the predetermined range from the relay place r3 as the alighting place. That is, the relay place r3 is not the final travel destination of the first user. Accordingly, in consideration of the following connectibility to the next rideshare vehicle, the extraction unit F322 can determine the alighting place without consideration of the relay place r3 itself. After the process of S302 is finished, the processing proceeds to S303.

Subsequently, in S303, the candidate vehicle extraction process is performed by the extraction unit F322 in the same manner. The candidate vehicle in this embodiment is a rideshare vehicle that supports the first user, who is to alight according to the alighting request, to travel toward the travel destination. The candidate vehicle is a rideshare vehicle that allows the first user to board at a place identical to the alighting place where the first user is allowed to alight, or a place adjacent to the alighting place. The extraction unit F322 then extracts one or more vehicles as candidate vehicles from among the group of vehicles that are registered in the vehicle database D310 and are provided for rideshare.

Here, as depicted in FIG. 14, the scheduled arrival time of the first vehicle 10 at the relay place r3 serving as the alighting place is regarded as T3. The scheduled arrival time T3 can be calculated on the basis of information on the current position of the first vehicle 10, the distance from the current position to the alighting place, the traffic situations on the route and the like. The extraction unit F322 then extracts the vehicle that allows the first user to board the vehicle at the relay place r3 or a place adjacent to the relay place r3 around the scheduled time T3 from among the vehicles registered in the vehicle database D310. Specifically, the extraction unit F322 temporarily extracts the vehicles that are determined as vehicles without any reservation provided for rideshare at the scheduled time T3 from the information on the rideshare reservation field of the vehicle information table depicted in FIG. 4 and are determined as vehicles not provided currently for rideshare from the information on the execution flag field of the vehicle information table. Furthermore, in consideration of the input information in the traveling position field and the input information in the destination field, vehicles that can reach the relay place r3 or the place adjacent to the relay place r3 at the scheduled time T3 or therearound and can travel to the travel destination of the first user are extracted as the candidate vehicles from among the temporarily extracted vehicles.

For example, the vehicle X50 depicted in FIG. 14 has the same destination as the travel destination of the first user. The time T3' when the vehicle X50 is expected to reach the place r3' adjacent to the relay place r3, which is the alighting place, from the current position can be a time around the scheduled time T3. Accordingly, the extraction unit F322 can extract the vehicle X50 as the candidate vehicle. Note that a calculation method analogous to the method of calculating the scheduled time T3 described above is applicable to calculation of the expected arrival time T3' of the vehicle X50 at the boarding place. Accordingly, in this embodiment, the boarding place into the vehicle X50 is the place r3' adjacent to the relay place r3 serving as the alighting place. After the process of S303 is finished, the processes of S106 and thereafter are performed. The processes of S106 and thereafter are as described in the first embodiment. Accordingly, the detailed description thereof is omitted.

Next, the processes of S304 to S306 after the negative determination in S301 are described. That is, the processes of S304 to 306 in a case where the first vehicle 10 has not come into the predetermined range yet from the relay place are described. First, in S304, the riding vehicle adjusting unit F320 determines whether the predetermined vehicle is present or not. The predetermined vehicle is a rideshare vehicle that is other than the first vehicle 10, can carry the first user to the travel destination, and is present in the range accessible by the first vehicle 10. Accordingly, in S304, presence or absence of the predetermined vehicle is determined on the basis of information on the position of the first vehicle 10 and obtainable information related to the travel of the vehicle other than the first vehicle 10, that is, information included in the vehicle information table registered in the vehicle database D310.

Specifically, the riding vehicle adjusting unit F320 determines presence or absence of vehicles which are within a predetermined second range from the position of the first vehicle 10 and of which the travel destinations are the first user's travel destination or a place adjacent thereto and which have a possibility of passing through the first user's travel destination or the place adjacent thereto in the middle of the travel, among the vehicles registered in the vehicle database D310. More specifically, the extraction unit F322 determines presence or absence of the vehicles that are determined as vehicles without any reservation provided for rideshare from the current time to the scheduled arrival time at the first user's travel destination from the information on the rideshare reservation field of the vehicle information table depicted in FIG. 4 and are determined as vehicles not provided currently for rideshare from the information on the execution flag field of the vehicle information table. Furthermore, based on the input information in the traveling position field, presence or absence of vehicles which are within the predetermined second range from the position of the first vehicle 10 and which can carry the first user to the travel destination or the place adjacent thereto is determined.

Note that the presence within the predetermined second range from the position of the first vehicle 10 is adopted as the condition as described above, because it is assumed that the first vehicle 10 accesses the predetermined vehicle and delivers the first user to the predetermined vehicle. If it is affirmatively determined in S304, the processing proceeds to S305. If it is negatively determined in S304, this control is finished.

In S305, the riding vehicle adjusting unit F320 extracts the predetermined vehicle as the candidate vehicle, and furthermore, in S306, the riding vehicle adjusting unit F320 determines the alighting place where the first user is allowed to alight, in order to allow the first user to board the predetermined vehicle serving as the candidate vehicle. In this embodiment, the riding vehicle adjusting unit F320 determines the alighting place so that the first user having alighted from the alighting place can board the predetermined vehicle at the same place, that is, the alighting place of the first vehicle 10 can coincide with the boarding place into the predetermined vehicle.

As depicted in FIG. 14, a vehicle X55 that is the predetermined vehicle regarded as the candidate vehicle is a vehicle traveling toward the first user's travel destination. However, the route toward the travel destination is different from the route scheduled for the first vehicle 10. An alighting place r4 for allowing the first user to board the vehicle X55 is determined as a place allowing the first vehicle 10 to reach the vehicle X55 on the scheduled travel route. Specifically, if the first vehicle 10 can arrive from the current position by the scheduled arrival time of the vehicle X55 at the predetermined place on the scheduled travel route, the predetermined place is determined as the alighting place. The scheduled arrival time of each vehicle can be calculated on the basis of information on the current position of each vehicle, the distance from the current position to the predetermined place, the traffic situations on the route and the like. After the process of S306 is finished, the processes of S106 and thereafter are performed.

As described above, according to the riding vehicle adjustment control depicted in FIG. 13, when the first user reaches the predetermined range from the relay place in the first vehicle 10, adjustment of matching for rideshare through the alighting request extracts the candidate vehicles for the first user after alighting, and determines the alighting place, thereby enabling the first user to travel quickly from the relay place to the originally specified travel destination. As a result, the travel to the travel destination is facilitated to be achieved by the rideshare. Furthermore, even if the first vehicle 10 allowing the first user to ride has not reached the predetermined range from the relay place yet, recognition of the presence of the predetermined vehicle as described above can suitably support the first user's travel to the travel destination.

In this embodiment, as described above, the candidate vehicles that can carry the first user to the travel destination or the place adjacent thereto are extracted. Alternatively, as described in the first embodiment, the candidate vehicles that can carry the first user to a predetermined alighting place, such as a railroad station, may be extracted. Accordingly, the candidate vehicles as many as possible can be presented to the first user. This contributes to the purpose of supporting the first user's travel.

Other Embodiments

The embodiments described above are examples. The present disclosure can be appropriately changed and executed in a scope without departing from the gist thereof.

The processes and means described in this disclosure can be freely combined and executed unless a technical contradiction occurs.

The process described as what is performed by a single device or apparatus may be shared among multiple devices or apparatuses and executed. Alternatively, the processes described as what is performed by different devices or apparatuses may be executed by a single device or apparatus. In a computer system, a hardware configuration (server configuration) that executes each function can be flexibly changed.

The present disclosure can also be achieved by providing a computer with a computer program where the functions described in the embodiments are implemented, and by causing one or more processors included in the computer to read and execute the program. Such a computer program may be provided for the computer through a non-transitory computer readable storage medium connectable to a system bus of the computer, or provided for the computer via a network. The non-transitory computer readable storage medium may be, for example, any type of disk, such as a magnetic disk (floppy (registered trademark) disk, hard disk drive (HDD), etc.) or an optical disk (CD-ROM, DVD disc, Blu-ray disc, etc.), or a read only memory (ROM), a random access memory (RAM), EPROM, EEPROM, a magnetic card, a flash memory or an optical card, or any type of medium suitable for storing electronic instructions.

What is claimed is:

1. An information processing apparatus comprising a controller configured to execute:
   accepting an alighting request of a first user traveling in a first vehicle to allow the first user to alight at a place other than an originally scheduled travel destination of the first user;
   performing determination of an alighting place where the first user is allowed to alight in response to the alighting request, and extraction of one or more candidate vehicles capable of allowing the first user to board at a boarding place that is a place identical to the alighting place or a place adjacent thereto, according to the alighting request,
      wherein the one or more candidate vehicles are extracted taking into consideration the originally scheduled travel destination, and the one or more candidate vehicles are capable of traveling to the originally scheduled travel destination; and
   notifying a request for the first user's reboarding at the boarding place, to a second vehicle that is one of the one or more candidate vehicles, based on an approval by the first user.

2. The information processing apparatus according to claim 1,
   wherein the controller accepts, from the first user, the alighting request including information related to the alighting place requested by the first user, and
   determines the alighting place according to the information related to the alighting place included in the alighting request, and extracts the one or more candidate vehicles capable of allowing the first user to board at the boarding place that is the place identical to the determined alighting place or the place adjacent thereto.

3. The information processing apparatus according to claim 1,
   wherein the controller extracts the one or more candidate vehicles capable of allowing the first user to ride, based on information on the position of the first vehicle when the alighting request is accepted, and information which is related to travel of a vehicle other than the first vehicle and which the controller can obtain, and determines the alighting place so that the first user can board each of the extracted one or more candidate vehicles at the alighting place in consideration of route information along which the corresponding candidate vehicle is scheduled to travel.

4. The information processing apparatus according to claim 1,
wherein the first vehicle is scheduled to allow the first user to ride to a relay place different from the travel destination, and
the controller accepts the alighting request issued by the first user or the first vehicle, when a current position of the first user belongs to a predetermined range from the relay place, and
determines a predetermined place in the predetermined range from the relay place as the alighting place upon acceptance of the alighting request, and extracts the one or more candidate vehicles capable of allowing the first user to board at the boarding place that is the place identical to the determined alighting place or the place adjacent thereto.

5. The information processing apparatus according to claim 4,
wherein upon recognition of presence of a predetermined vehicle capable of allowing the first user to travel to the travel destination when the current position of the first vehicle does not belong to the predetermined range from the relay place yet, the controller extracts the predetermined vehicle as the candidate vehicle and determines, as the alighting place, a place where the predetermined vehicle allows the first user to board, irrespective of absence of acceptance of the alighting request.

6. The information processing apparatus according to claim 1,
wherein the controller extracts, as the one or more candidate vehicles, vehicles which are to travel through a predetermined alighting place which is a place where even a vehicle which is not to travel through a travel destination of the first user can allow the first user to travel to the travel destination, based on information which the controller can obtain and which is related to a travel of a vehicle other than the first vehicle.

7. The information processing apparatus according to claim 1, wherein the controller is further configured to inform the second vehicle to pick up the user at the boarding place, and to request the second vehicle to take the user to the originally scheduled travel destination.

8. A riding vehicle adjusting method causing a computer to:
accept an alighting request of a first user traveling in a first vehicle to allow the first user to alight at a place other than an originally scheduled travel destination of the first user;
perform determination of an alighting place where the first user is allowed to alight in response to the alighting request, and extraction of one or more candidate vehicles capable of allowing the first user to board at a boarding place that is a place identical to the alighting place or a place adjacent thereto, according to the alighting request;
wherein the one or more candidate vehicles are extracted taking into consideration the originally scheduled travel destination, and the one or more candidate vehicles are capable of traveling to the originally scheduled travel destination; and
notify a request for the first user's reboarding at the boarding place, to a second vehicle that is one of the one or more candidate vehicles, based on an approval by the first user.

9. A riding vehicle adjusting program causing a computer to execute:
a step of accepting an alighting request of a first user traveling in a first vehicle to allow the first user to alight at a place other than an originally scheduled travel destination of the first user;
a step of performing determination of an alighting place where the first user is allowed to alight in response to the alighting request, and extraction of one or more candidate vehicles capable of allowing the first user to board at a boarding place that is a place identical to the alighting place or a place adjacent thereto, according to the alighting request,
wherein the one or more candidate vehicles are extracted taking into consideration the originally scheduled travel destination, and the one or more candidate vehicles are capable of traveling to the originally scheduled travel destination; and
a step of notifying a request for the first user's reboarding at the boarding place, to a second vehicle that is one of the one or more candidate vehicles, based on an approval by the first user.

* * * * *